(12) United States Patent
Bohme

(10) Patent No.: US 10,280,108 B2
(45) Date of Patent: May 7, 2019

(54) DEVICE AND METHOD FOR CUTTING OUT CONTOURS FROM PLANAR SUBSTRATES BY MEANS OF LASER

(71) Applicant: Corning Laser Technologies GmbH, Krailling (DE)

(72) Inventor: Rico Bohme, Rochlitz (DE)

(73) Assignee: CORNING LASER TECHNOLOGIES GMBH, Krailling (DE)

( * ) Notice: Subject to any disclaimer, the term of this patent is extended or adjusted under 35 U.S.C. 154(b) by 634 days.

(21) Appl. No.: 15/032,252

(22) PCT Filed: Mar. 18, 2014

(86) PCT No.: PCT/EP2014/055364
§ 371 (c)(1),
(2) Date: Apr. 26, 2016

(87) PCT Pub. No.: WO2014/147048
PCT Pub. Date: Sep. 25, 2014

(65) Prior Publication Data
US 2016/0280580 A1    Sep. 29, 2016

(30) Foreign Application Priority Data
Mar. 21, 2013    (EP) .................................... 13160420

(51) Int. Cl.
*C03B 33/04*    (2006.01)
*B23K 26/53*    (2014.01)
(Continued)

(52) U.S. Cl.
CPC .......... *C03B 33/04* (2013.01); *B23K 26/0006* (2013.01); *B23K 26/38* (2013.01);
(Continued)

(58) Field of Classification Search
CPC ... C03B 33/04; C03B 33/0222; C03B 33/091; C03B 33/082; C03B 25/025;
(Continued)

(56) References Cited

U.S. PATENT DOCUMENTS 1,790,397 A    1/1931    Woods et al.
2,682,134 A    6/1954    Stookey
(Continued)

FOREIGN PATENT DOCUMENTS

CN    2388062 Y    7/2000
CN    1283409 C    11/2006
(Continued)

OTHER PUBLICATIONS

Kerr. "Filamentary tracks formed in transparent optical glass by laser beam self-focusing. II. Theoretical Analysis" Physical Review A. 4(3) 1971, pp. 1196-1218.
(Continued)

*Primary Examiner* — Queenie S Dehghan
(74) *Attorney, Agent, or Firm* — Smit Kapadia; Svetlana Z. Short

(57) ABSTRACT

The present invention relates to a method for producing a contour in a planar substrate and for separating the contour from the substrate, in particular for producing an internal contour in a planar substrate and for removing the internal contour from the substrate, wherein, in a contour definition step by means of a laser beam guided over the substrate along a contour line characterizing the contour to be produced, a large number of individual zones of internal damage is produced in the substrate material, in a crack definition step by means of a laser beam guided over the substrate along a plurality of crack line portions, which, viewed from the contour line, leads away at an angle a>0°, and into the contour to be separated, respectively a large number of (Continued)

Figure 1A:
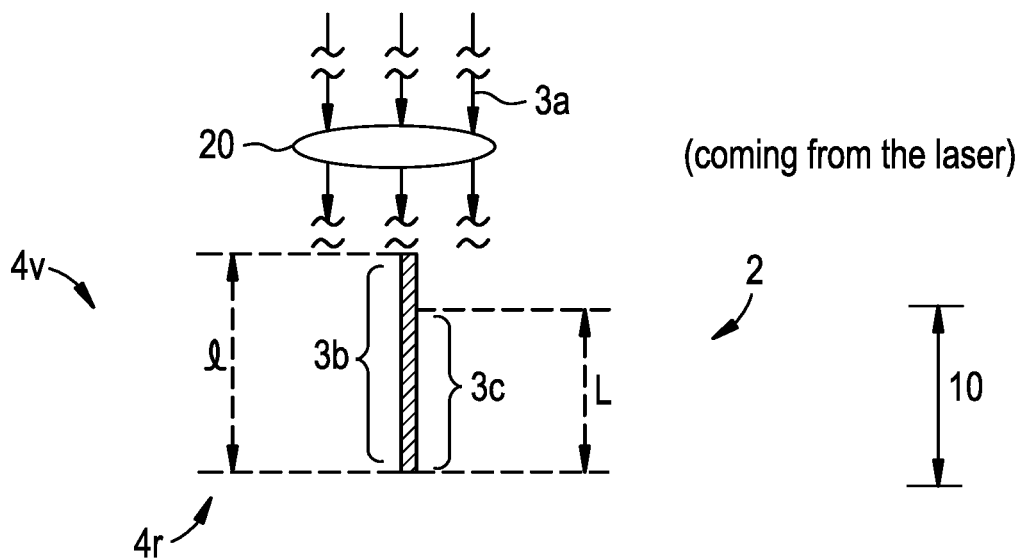

individual zones of internal damage is produced in the substrate material and, in a material removal step implemented after the contour definition step and after the crack definition step by means of a material-removing laser beam guided over the substrate along a material removal line which extends along the contour line but at a spacing from the latter and also in the contour to be separated, furthermore which preferably cuts the crack line portions, the substrate material is removed over the entire substrate thickness.

16 Claims, 14 Drawing Sheets

(51) Int. Cl.
| | |
|---|---|
| *B23K 26/00* | (2014.01) |
| *C03B 33/02* | (2006.01) |
| *C03B 33/09* | (2006.01) |
| *B23K 26/38* | (2014.01) |
| *B23K 26/40* | (2014.01) |
| B23K 103/00 | (2006.01) |
| C03B 33/08 | (2006.01) |
| C03B 25/02 | (2006.01) |

(52) U.S. Cl.
CPC ............ *B23K 26/40* (2013.01); *B23K 26/53* (2015.10); *C03B 33/0222* (2013.01); *C03B 33/091* (2013.01); *B23K 2103/50* (2018.08); *B23K 2103/54* (2018.08); *B23K 2103/56* (2018.08); *C03B 25/025* (2013.01); *C03B 33/082* (2013.01)

(58) Field of Classification Search
CPC B23K 26/53; B23K 26/0006; B23K 26/0057; B23K 26/38; B23K 26/40; B23K 2203/50; B23K 2203/54; B23K 2203/56
See application file for complete search history.

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,656,186 A | 8/1997 | Mourou et al. |
| 5,676,866 A | 10/1997 | In Den Baumen et al. |
| 5,684,642 A | 11/1997 | Zumoto et al. |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,033,583 A | 3/2000 | Musket et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,402,773 B2 | 7/2008 | Nomaru |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |

(56) References Cited

U.S. PATENT DOCUMENTS

| | | | |
|---|---|---|---|
| 8,697,228 B2 | 4/2014 | Carre et al. | |
| 8,720,228 B2 | 5/2014 | Li | |
| 8,826,696 B2 | 9/2014 | Brown et al. | |
| 8,852,698 B2 | 10/2014 | Fukumitsu | |
| 8,887,529 B2 | 11/2014 | Lu et al. | |
| 8,916,798 B2 | 12/2014 | Plüss | |
| 8,943,855 B2 | 2/2015 | Gomez et al. | |
| 8,971,053 B2 | 3/2015 | Kariya et al. | |
| 9,138,913 B2 | 9/2015 | Arai et al. | |
| 9,227,868 B2 | 1/2016 | Matsumoto et al. | |
| 9,290,407 B2 | 3/2016 | Barefoot et al. | |
| 9,296,066 B2 | 3/2016 | Hosseini et al. | |
| 9,324,791 B2 | 4/2016 | Tamemoto | |
| 9,327,381 B2 | 5/2016 | Lee et al. | |
| 9,446,590 B2 | 9/2016 | Chen et al. | |
| 9,481,598 B2 | 11/2016 | Bergh et al. | |
| 2002/0046997 A1 | 4/2002 | Nam et al. | |
| 2002/0082466 A1 | 6/2002 | Plan | |
| 2002/0097486 A1 | 7/2002 | Yamaguchi et al. | |
| 2002/0110639 A1 | 8/2002 | Bruns | |
| 2003/0006221 A1 | 1/2003 | Hong et al. | |
| 2003/0007773 A1 | 1/2003 | Kondo et al. | |
| 2004/0144231 A1* | 7/2004 | Hanada | C03B 33/04 83/880 |
| 2004/0221615 A1 | 11/2004 | Postupack et al. | |
| 2005/0024743 A1 | 2/2005 | Camy-Peyret | |
| 2005/0098548 A1 | 5/2005 | Kobayashi et al. | |
| 2005/0115938 A1 | 6/2005 | Sawaki et al. | |
| 2005/0274702 A1 | 12/2005 | Deshi | |
| 2005/0277270 A1 | 12/2005 | Yoshikawa et al. | |
| 2006/0011593 A1 | 1/2006 | Fukuyo | |
| 2006/0028728 A1 | 2/2006 | Li | |
| 2006/0109874 A1 | 5/2006 | Shiozaki et al. | |
| 2006/0127679 A1 | 6/2006 | Gulati et al. | |
| 2006/0151450 A1 | 7/2006 | You et al. | |
| 2006/0227440 A1 | 10/2006 | Gluckstad | |
| 2006/0266744 A1 | 11/2006 | Nomaru | |
| 2006/0289410 A1 | 12/2006 | Morita et al. | |
| 2007/0091977 A1 | 4/2007 | Sohn et al. | |
| 2007/0111390 A1 | 5/2007 | Komura et al. | |
| 2007/0111480 A1 | 5/2007 | Maruyama et al. | |
| 2007/0119831 A1 | 5/2007 | Kandt | |
| 2007/0132977 A1 | 6/2007 | Komatsuda | |
| 2007/0138151 A1 | 6/2007 | Tanaka et al. | |
| 2007/0177116 A1 | 8/2007 | Amako | |
| 2007/0202619 A1 | 8/2007 | Tamura et al. | |
| 2007/0298529 A1 | 12/2007 | Maeda et al. | |
| 2008/0000884 A1 | 1/2008 | Sugiura et al. | |
| 2008/0079940 A1 | 4/2008 | Sezerman et al. | |
| 2008/0099444 A1 | 5/2008 | Misawa et al. | |
| 2009/0013724 A1 | 1/2009 | Koyo et al. | |
| 2009/0176034 A1 | 7/2009 | Ruuttu et al. | |
| 2009/0183764 A1 | 7/2009 | Meyer | |
| 2009/0242528 A1 | 10/2009 | Howerton et al. | |
| 2009/0250446 A1 | 10/2009 | Sakamoto | |
| 2009/0294419 A1 | 12/2009 | Abramov et al. | |
| 2009/0294422 A1 | 12/2009 | Lubatschowski et al. | |
| 2009/0324899 A1 | 12/2009 | Feinstein et al. | |
| 2010/0025387 A1 | 2/2010 | Arai et al. | |
| 2010/0029460 A1 | 2/2010 | Shojiya et al. | |
| 2010/0032087 A1 | 2/2010 | Takahashi et al. | |
| 2010/0086741 A1 | 4/2010 | Bovatsek et al. | |
| 2010/0089631 A1 | 4/2010 | Sakaguchi et al. | |
| 2010/0089882 A1 | 4/2010 | Tamura | |
| 2010/0102042 A1 | 4/2010 | Garner et al. | |
| 2010/0129603 A1 | 5/2010 | Blick et al. | |
| 2010/0147813 A1 | 6/2010 | Lei et al. | |
| 2010/0252540 A1 | 10/2010 | Lei et al. | |
| 2010/0252959 A1 | 10/2010 | Lei et al. | |
| 2010/0276505 A1 | 11/2010 | Smith | |
| 2010/0279067 A1 | 11/2010 | Sabia et al. | |
| 2010/0287991 A1 | 11/2010 | Brown et al. | |
| 2010/0320179 A1 | 12/2010 | Morita et al. | |
| 2010/0326138 A1 | 12/2010 | Kumatani et al. | |
| 2011/0049764 A1 | 3/2011 | Lee et al. | |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0216573 A1 | 5/2013 | Hosseini et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |

(56) References Cited

U.S. PATENT DOCUMENTS

| | | |
|---|---|---|
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0169847 A1 | 6/2017 | Tamaki |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102343631 A | 2/2012 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201226345 | 7/2012 |
| WO | 1999029243 A1 | 7/1999 |
| WO | 1999063900 A1 | 12/1999 |

(56) References Cited

FOREIGN PATENT DOCUMENTS

| WO | 2004110693 A1 | 12/2004 |
|---|---|---|
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.

Ahmed, F. et al.; Display glass cutting by femtosecond laser induced single shot periodic void array; Applied Physics A Material Science & Processing; Jun. 3, 2008; pp. 189-192; vol. 93; Springer-Verlag.

Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

Bhuyan, M.K. et al.; Femtosecond non-diffracting Bessel beams and controlled nanoscale ablation; ResearchGate Conference Paper; Sep. 2011; pp. 1-4.

Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.

Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.

Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.

Case Design Guidelines for Apple Devices; Sep. 13, 2013; pp. 1-58; Apple Inc.

Chiao, R. Y. et al.; Self-Trapping of Optical Beams; Physical Review Letters; Oct. 12, 1964; pp. 479-482; vol. 13, No. 15.

Corning Eagle AMLCD Glass Substrates Material Information; Apr. 2005; pp. MIE 201-1-MIE 201-3; Corning Incorporated.

Corning 1737 AMLCD Glass Substrates Material Information; Aug. 2002; pp. MIE 101-1-MIE 101-3; Corning Incorporated.

Couairon, A. et al.; Femtosecond filamentation in transparent media; ScienceDirect Physical Reports; Feb. 6, 2007; pp. 47-189; vol. 441; Elsevier B.V.

Courvoisier, F. et al.; Applications of femtosecond Bessel beams to laser ablation; Applied Physics A Materials Science & Processing; Sep. 6, 2012; pp. 29-34; vol. 112; Springer-Verlag.

Courvoisier, F. et al.; Surface nanoprocessing with nondiffracting femtosecond Bessel beams; Optics Letters; Oct. 15, 2009; pp. 3163-3165; vol. 34, No. 20; Optical Society of America.

Dong, M. et al.; On-axis irradiance distribution of axicons illuminated by spherical wave; ScienceDirect Optics & Laser Technology; Sep. 2007; pp. 1258-1261; vol. 39; Elsevier Ltd.

Duocastella, M. et al.; Bessel and annular beams for materials processing; Laser & Photonics Reviews; 2012; pp. 607-621; vol. 6, No. 5.

Durnin, J.; Exact solutions for nondiffracting beams. I. The scalar theory; J. Opt. Soc. Am. A; Apr. 1987; pp. 651-654; vol. 4, No. 4; Optical Society of America.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

(56) References Cited

OTHER PUBLICATIONS

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.
Xu, H. et al.; Optimization of 3D laser cutting head orientation based on minimum energy consumption; Int J Adv Manuf Technol; Jun. 28 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov et al., "Laser separation of chemically strengthened glass"; Physics Procedia 5 (2010) 285-290, Elsevier.; doi: 10.1016/j.phpro.2010.08.054.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"Pharos High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

\* cited by examiner (coming from the laser)

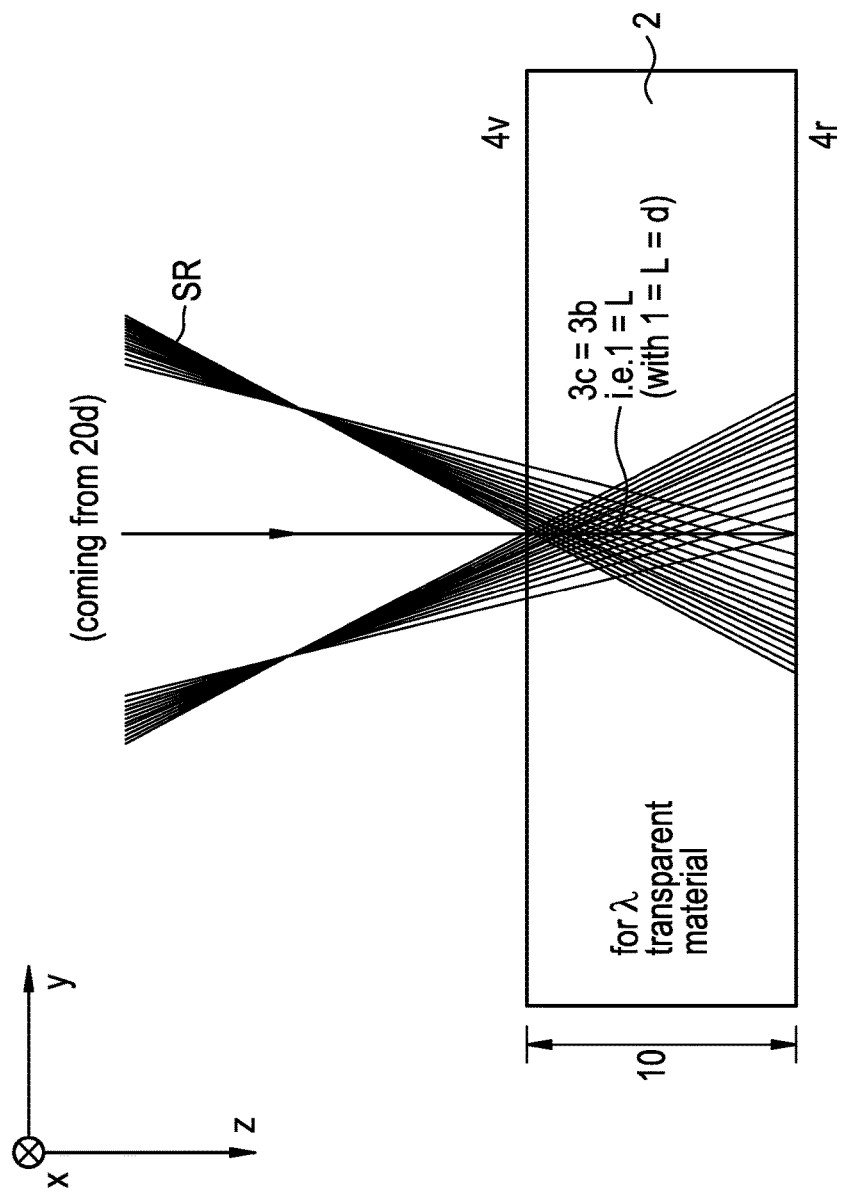

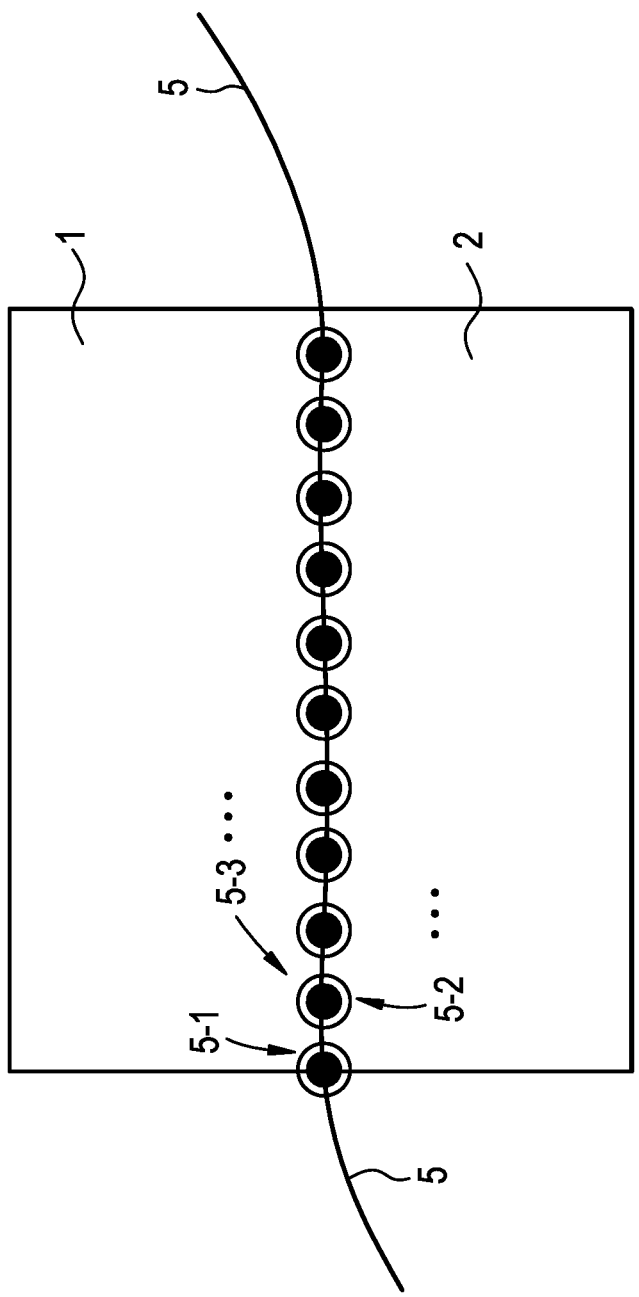

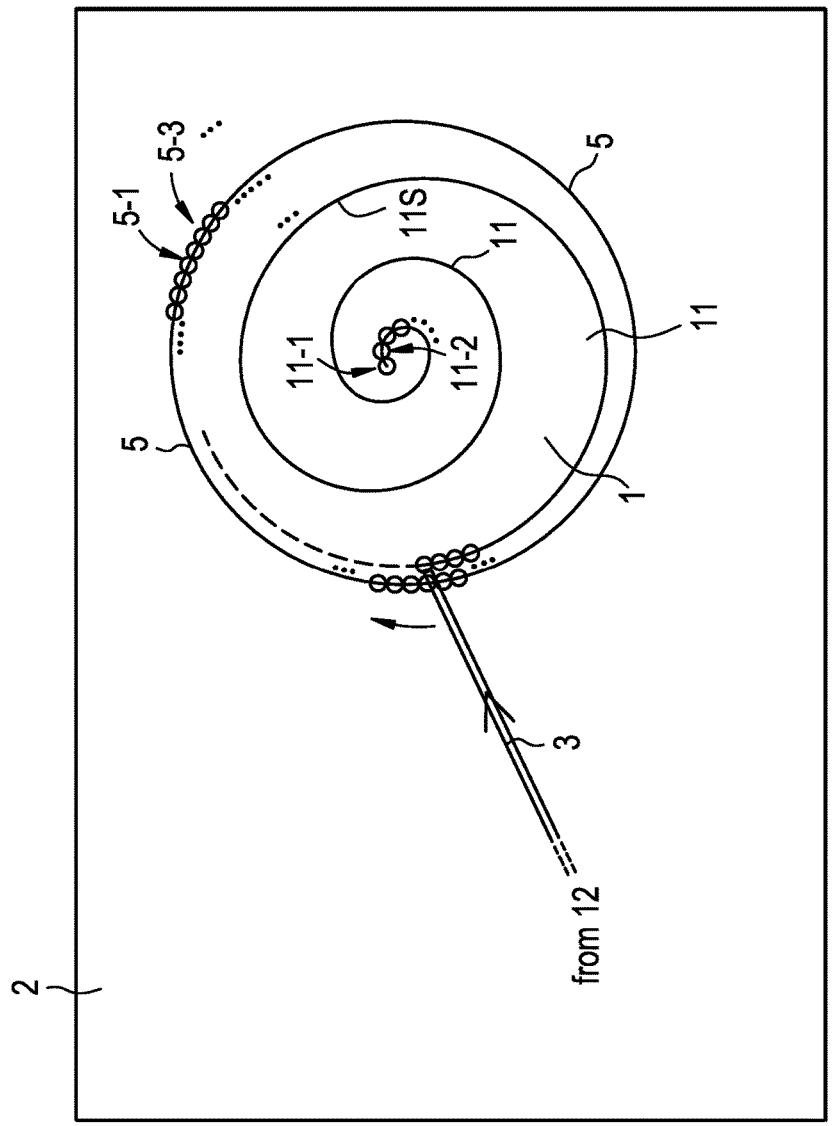

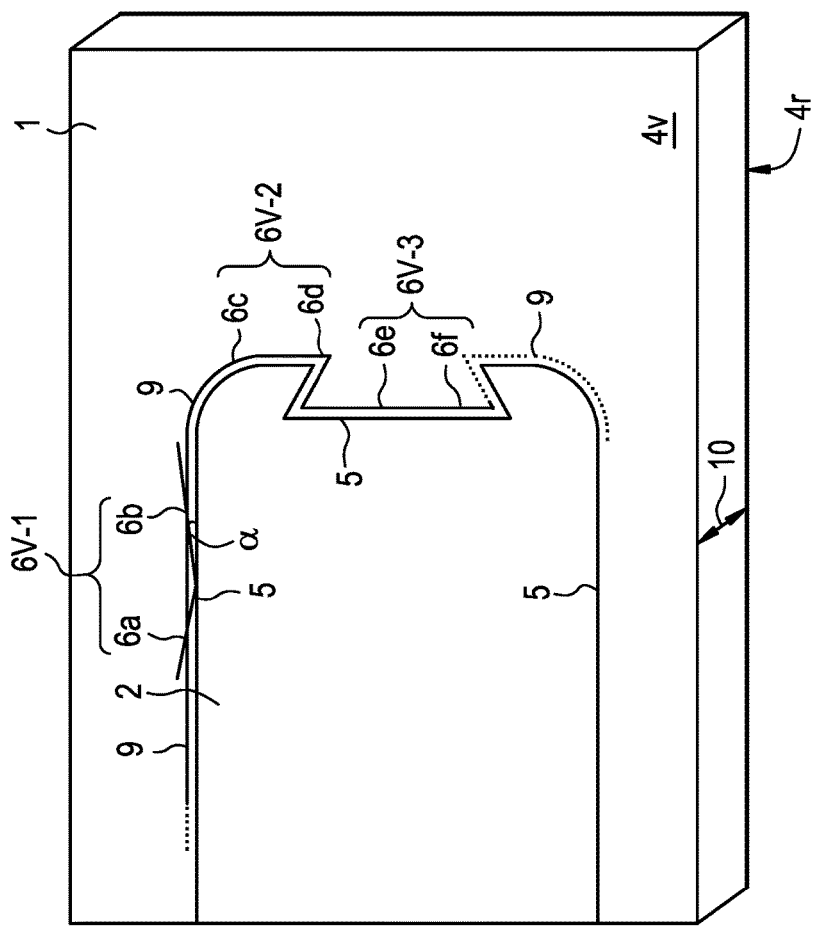

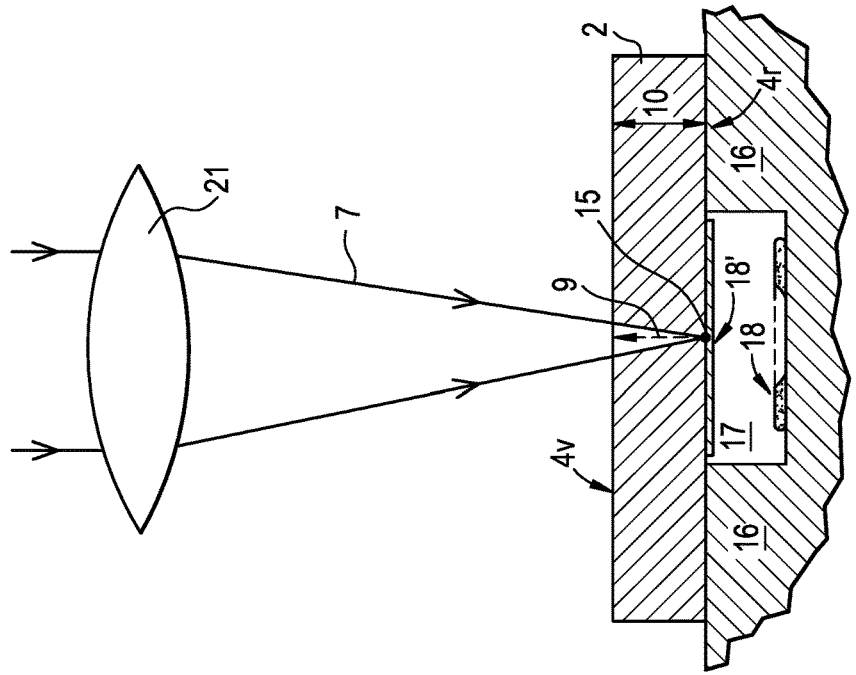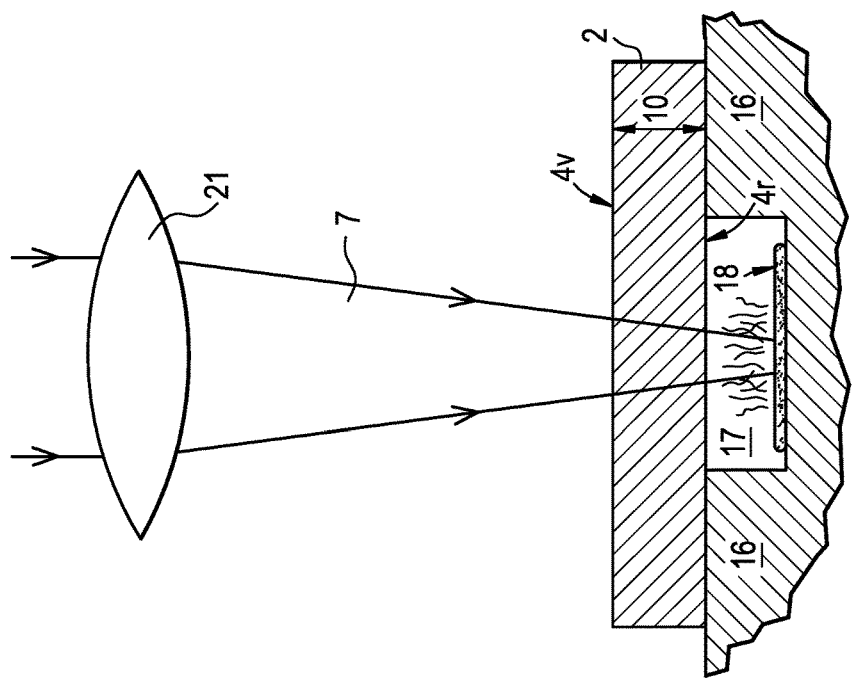

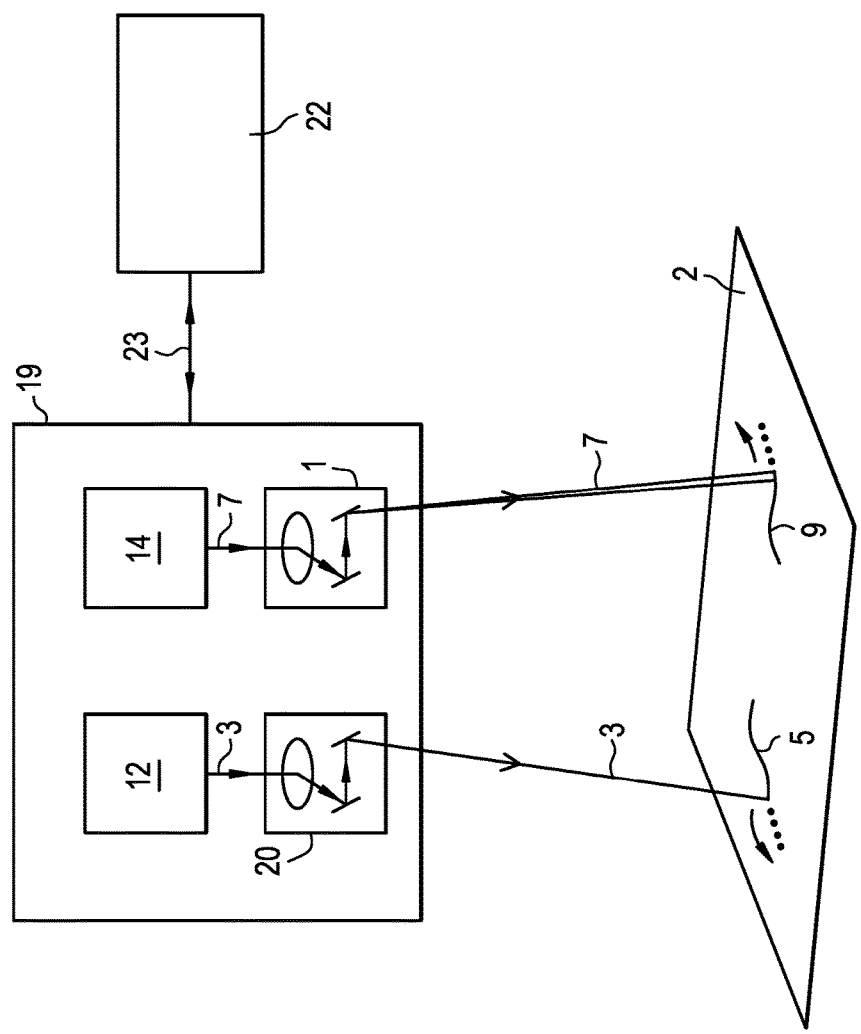

DEVICE AND METHOD FOR CUTTING OUT CONTOURS FROM PLANAR SUBSTRATES BY MEANS OF LASER

CROSS-REFERENCE TO RELATED APPLICATIONS

This application claims the benefit of priority under 35 U.S.C. § 371 of International Application Serial No. PCT/EP14/055364, filed on Mar. 18, 2014, which, in turn, claims the benefit of priority of European Application Serial No. 13160420.9, filed on Mar. 21, 2013, the contents of which is relied upon and incorporated herein by reference in its entirety.

The present invention relates to a device and to a method for cutting out contours from planar substrates (in particular: from glass substrates or crystal substrates) by means of laser.

DE 10 2011 00768 A1 describes how, with the help of a laser, semiconductor wafers, glass elements and other substrates can be divided into various parts by the wavelength of the laser being greatly absorbed by the material. As a result, material removal which leads finally to division of the substrate into a plurality of parts is effected. However, this method has disadvantages in the case of many materials, such as for example impurities due to particle formation during ablation or cut edges which have undesired microcracks or melted edges so that a cut gap which is not uniform over the thickness of the material is produced. Since in addition material must be vaporised or liquefied, a high average laser power must be provided.

Starting from the state of the art, it is therefore the object of the present invention to make available a method (and also a corresponding device) with which planar substrates, in particular made of brittle materials, can be machined with minimum crack formation at the edges, with as straight as possible cut edges and at a high process speed such that contours can be machined out from these substrates (and finally separated) without the result being undesired cracks, flaking or other disruptions which extend in the substrate plane remaining in the substrate after separation of the contours. Hence the aim of the present invention is exact, clean separation of a contour from a substrate, in particular clean, precise removal of internal contours from the substrate.

As is described subsequently in detail also, the operation takes place, according to the invention, generally with a pulsed laser at a wavelength for which the substrate material is essentially transparent. However, basically also the use of a continuous-wave laser is possible provided that the laser beam can be switched rapidly on and off again during guidance thereof over the substrate surface (e.g. by means of an optical modulator) in order to produce zones of internal damage situated one behind the other (see subsequently).

The object according to the invention is achieved by a method according to claim 1 and also by a device according to claim 16, advantageous variants being described in the dependent claims.

Subsequently, the invention is first described in general, then with reference to embodiments. The features according to the invention produced within the scope of the embodiments need not thereby be produced precisely in the illustrated combinations within the scope of the invention but rather individual features can also be omitted or combined with other features in a different way. In particular, also features of different embodiments can be combined with each other or individual ones of the illustrated features can also be omitted.

The essential features of the method according to the invention are described in claim 1. The contour is thereby understood as a two-dimensional surface in the substrate plane in the form of a partial surface of the substrate. The portions of the substrate corresponding to this partial surface are intended to be removed from the substrate, the remaining portions of the substrate being intended to be further processed in subsequent processes. In other words: the contour to be separated from the substrate forms an undesired surface which can also be destroyed, the remaining substrate portions are intended to survive the separation process of the contour without internal damage and also with as ideal cut edges as possible according to the contour line. This is achieved according to the invention. Subsequently, there is/are thereby understood by the substrate, both the still unmachined substrate before separation of the contour and the remaining substrate remains after the separation of the contour. From the context respectively, the person skilled in the art knows what is intended.

According to the invention, the contour definition step is effected such that, after implementation thereof, the contour course of the contour is inscribed into the substrate material, however the contour is still connected to the substrate so that complete separation of the contour from the substrate is still not effected: the step-wise complete separation of the undesired contour from the substrate is effected by the contour definition step, the optional crack definition step, the optional stress-relieving step and the material removal- and/or material deformation step and, provided still required (i.e. if the contour remains do not independently already fall off by means of intrinsic stresses in the material after implementing steps (a) to (d)), by an optional aftertreatment step. Also the introduction of the individual zones of internal damage in the optional crack definition step (cf. claim 4) and in the optional stress-relieving step is effected such that complete separation of the consequently produced partial portions in the substrate is still not effected.

Implementation of the optional crack definition step is effected preferably after conclusion of the contour definition step but this is not necessary: thus for example also partial portions of the contour line can be produced firstly by introducing the zones of internal damage before the crack definition step for producing the crack line portions is implemented and, after conclusion of the same, the remaining contour line portions of the contour definition step are introduced into the substrate material.

There is understood by the term of a crack line portion leading away from the contour line at an angle $\alpha > 0°$, that the angle $\alpha$ between the local tangent to the contour line at that place where the mentioned (possibly continued towards the contour line) crack line portion leads away from the contour line, and the local tangent at that end of the crack line portion, which is orientated towards the contour line, is greater than 0°.

According to the invention, the laser irradiation in steps (a), (b) and (d) (i.e. in the contour definition step, in the crack definition step and in the stress-relieving step—subsequently these terms (a) to (d) are also used alternatively for the steps according to the invention) need not be effected perpendicular to the substrate plane, i.e. the individual zones of internal damage need not extend perpendicular to the substrate plane (and also need not definitely pass through the entire substrate thickness perpendicular to the substrate plane). The laser irradiation can be effected also at an angle>0° (for example between 0° and 20°) relative to the substrate normal (inclined introduction of the zones of internal damage).

There are understood by the internal contours machined preferably within the scope of the invention (i.e. to be introduced and removed) simply coherent quantities of the two-dimensional space (plane of the substrate) or corresponding partial portions in the substrate, from a mathematical point of view. The internal contours to be removed therefrom can thereby have almost any shapes. In particular, circular shapes, ellipse shapes, pin-cushion shapes, oblong shapes (with rounded corners) etc. are possible for the internal contours, by the laser beam being moved on the substrate surface along a correspondingly shaped contour line. Preferably, the substrate is disposed thereby in a stationary manner within the world coordinate system and the laser beam is moved over the substrate surface by a suitable beam-guiding optical unit (which can have for example an F-theta lens followed by a galvanometer scanner). Alternatively, also a beam-guiding lens system which is stationary relative to the world coordinate system is possible, the substrate then requiring to be moved in the world coordinate system relative to the beam-guiding lens system and to the laser beam.

There is understood subsequently by substrate thickness, the extension of the substrate perpendicular to the substrate plane, i.e. between substrate front-side and the substrate rear-side. The substrate front-side is thereby that surface of the substrate which is orientated towards the radiated laser light.

The first preferably achieved features of the method according to the invention (material removal for introduction of a removal line) can be deduced from claim 2.

This material removal can be applied in particular to large and small radii of internal contours to be separated and is suitable in particular for smaller contours, such as e.g. sections of a circle with a diameter<2.5 mm and for oblong holes.

For the material removal, a $CO_2$ laser with a beam diameter of in the range between approx. 0.05 mm and 0.5 mm, when impinging on the substrate (achieved by focusing) can be used. The $CO_2$ laser can be pulsed or applied continuously. Preferably, pulses in the range of 100 µs to 4,000 µs are used with pulse train frequencies of 0.1 kHz to 100 kHz. For particular preference, the pulse duration is in the range between 300 µs and 4,000 µs with 0.1 kHz to 3 kHz pulse train frequency. The laser power can be in the range of 10 to 200 W, preferably however in the range of 10 to 100 W.

The travel path of the laser beam is along the contour line, at a spacing from this and in the contour to be separated, for example therefore on a (parallel) trajectory symmetrical to the target contour. For example with a circular contour to be removed (hole section), a circular movement. The travel path can be performed either once or with multiple repetition.

Due to the small focus diameter and the high laser powers, the substrate material is primarily melted (material removal). Together with laser pulses in the upper microsecond range, the entire substrate material thickness (e.g. 0.7 mm) can thus be heated through completely with one pulse.

The material removal step can be assisted by the use of a gas nozzle with process gas (e.g. CDA). With for example a nozzle diameter of 2 mm and gas pressures of 1.5 to 4 bar, material removal can be produced particularly well even for small contours and radii. By means of the gas flow, the material melted by the laser is expelled in the beam direction.

With the above-described parameters, for example also toughened glasses (DOL 40 µm) can be supplied for material removal without the result being damaging crack formation.

The removal contour (removal line) should be removed sufficiently far from the contour line (target contour cut) (generally, spacings here of approx. 0.1 to 0.3 mm suffice, according to the substrate material): for example with a circular glass disc of 2 mm diameter which is to be removed, the minimum spacing of the removal line from the contour line should be 0.1 mm (deformation diameter or diameter of the circular removal line at most 1.8 mm). In the case of a glass sheet diameter of 1.5 mm, the deformation diameter should be at most 1.3 mm. In the case of a glass disc diameter of 1.0 mm, the deformation diameter should be at most 0.8 mm.

The crack line portions (e.g. V-cuts) which are described subsequently in more detail have an assisting effect for the complete separation of the contour.

According to the advantageous features of claim 3, instead of one, or in addition to a material removal according to claim 2, also removal of material portions of the contour to be separated is possible by means of thermal deformation.

A $CO_2$ laser or the laser beam thereof for extraction of substrate material in a manner which does not remove substrate material, i.e can be used in a purely thermally deforming manner in substrate material (in particular of the contour to be separated) (this is effected preferably in the case of fairly large contours to be separated, e.g. in the case of circular sections with a diameter≥2.5 mm, preferably ≥5-10 mm, to be separated).

The procedure with such a material deformation step can be as follows:

By means of $CO_2$ laser irradiation of the substrate, e.g. by means of movement of the laser beam along the contour line but at a spacing therefrom and also in the contour to be separated (for example along a circle or a spiral in the centre of the contour to be separated), at least portions of the contour to be separated are heated such that the result is a plastic deformation of at least portions of the contour to be separated. The diameter of the $CO_2$ laser spot impinging on the substrate material can cover a wide range: 0.1 mm to 10 mm. A diameter of 0.2 mm to 3 mm is preferred. The $CO_2$ laser can be operated both pulsed and continuously. Preferably, however, pulses in the range of 6 µs to 4,000 µs are used with pulse train frequencies in the range of 0.1 kHz to 100 kHz. The laser power can be in the range between 10 and 300 W, preferably in the range between 10 and 50 W.

The travel path of the laser is preferably a trajectory which is symmetrical (e.g. parallel, but at a spacing) relative to the contour to be separated (target contour). For example in the case of a hole section as internal contour to be separated, a circular movement. However a spiral movement can also have a favourable effect on the thermoplastic deformation of such an internal contour (e.g. glass disc). In certain cases, it can prove to be favourable if the laser beam remains stationary over a defined time interval of for example 0.5 s simply in the centre of the contour to be separated and heats through and thus deforms the contour to be separated. The travel path can be covered either once or with multiple repetition which can have a favourable effect on the thermoplastic deformation of the contour to be separated.

The plastic deformation in the centre leads to shrinkage of the contour to be separated (e.g. glass disc) due to a thermally-induced flow of the substrate material (e.g. glass material) in the irradiated region in the centre and towards the centre. For example in the case of a circular disc as contour to be separated, this can be seen as follows:

The deformation generally forms, as a result of gravity, a bulge away from the laser in the direction of the centre of the earth. This bulge possibly can adopt a drop shape. The surface topography can be compared with that of a convex lens.

Under specific laser conditions, a bulge is also formed towards the laser. The surface topography is then that of a biconvex lens.

Under specific laser conditions, a dent (concave) is formed on one side and, on the opposite surface, a bulge.

If the irradiated surface is subjected to a flow of process gas (commercial air, CDA) in parallel and contemporaneously via a gas nozzle, the formation of the bulge and/or dent can be controlled very precisely. As a result, even contours with very small radii (<2.5 mm to 1.2 mm) can be introduced for the removal. In the case of for example a nozzle diameter of 2 mm and gas pressures in the range of 1.5 to –3 bar, relatively small contours can be particularly readily removed.

What the described thermoplastic deformation variants have in common is that substrate material of the contour to be separated flows (e.g. in the case of an internal contour to be removed flows towards the centre of the same) and consequently a gap relative to the remaining substrate material is formed (e.g. externally situated material of an internal contour to be removed). Such a gap can have dimensions of approx. 10 μm to 50 μm.

After a short thermal relaxation time (cooling and shrinkage of the contour to be separated), the contour to be separated falls out purely due to the forming gap.

In the case of the material deformation step, hence no substrate material is removed, no removal products are produced.

The $CO_2$-induced thermoplastic deformation or the regions irradiated by the laser should be removed sufficiently far (generally spacings of approx. 1 to 3 mm suffice according to the substrate material) from the already introduced contour line (contour cut): for example with a glass disc of 10 mm diameter to be removed, the region irradiated centrally in this glass disc (deformation diameter) should have a diameter of 8 mm at most. In the case of a glass disc diameter of 5 mm, this region should be 3.4 mm at most. In the case of a glass disc diameter of 2.5 mm, this region should be 1.5 mm at most.

The already introduced contour line (target contour cut) forms a sufficient thermal insulation relative to the surrounding material of the residual, remaining substrate so that, with suitable thermoplastic deformation diameter, no disadvantageous thermal effect on the cut edge or on the surrounding material in the form of chipping or parasitic crack formation can be effected.

In the subsequent embodiments, the material removal- and/or material deformation step as material removal step is effected by means a material-removing laser beam which is not illustrated in more detail.

Further preferably produced features can be deduced from claims 4 to 6.

The ultrasonic treatment according to claim 6 can be effected as follows: frequency range between 1 kHz and 50 kHz (particularly preferred: 5 kHz-40 kHz). The surface in the interior of the cut contour (i.e. in the contour to be separated) is thereby preferably contacted with an ultrasonic actuator. The contact surface can thereby correspond to the dimensions and the shape of an internal contour to be separated. The contact can be implemented over the entire surface or as a ring. In a particular embodiment, substrate regions situated outside the contour to be separated can be treated with ultrasound (also simultaneous ultrasound treatment of the contour to be separated and such remaining substrate regions is possible).

A corresponding aftertreatment step is however frequently not required at all since the zones of internal damage, which are introduced in step (b) (and in the possibly implemented optional step (d)) already have internal stresses introduced into the substrate material which suffice for the undesired contour remains to be detached by themselves from the remaining substrate (self-removal of the contour remains) in the course of the material removal- and/or material deformation step or after the same.

Further advantageous achievable method features can be deduced from claim 7 and claim 8.

All of the already described advantageous features and of the subsequently also described advantageous features can be produced thereby, within the scope of the invention, respectively individually or also in any combinations with each other.

The point focusing described in claim 8 can thereby be implemented as described in U.S. Pat. No. 6,992,026 B2 or in WO 2012/006736 A2.

According to the invention, it is however particularly preferred to introduce the individual zones of internal damage along the contour line, the crack-line portions and possibly also the stress-relieving line portions by means of the laser beam focal line described in claim 8 (i.e. by induced absorption in the substrate material along an extended portion in the thickness direction of the material).

This preferred embodiment of step (a), (b) and (d) is now described subsequently in detail.

Firstly, it is thereby essential that the wavelength of the irradiating laser is chosen in coordination with the substrate to be machined such that the substrate material is essentially transparent for this laser wavelength (see also claim 11).

The method for steps (a), (b) and (d) produces a laser focal line per laser pulse (in contrast to a focal point) by means of a laser lens system which is suitable for this purpose (subsequently also termed alternatively beam-guiding optical unit or optical arrangement). The focal line determines the zone of interaction between laser and material of the substrate. If the focal line falls into the material to be separated, then the laser parameters can be chosen such that an interaction with the material takes place and produces a crack zone along the focal line. Important laser parameters here are the wavelength of the laser, the pulse duration of the laser, the pulse energy of the laser and possibly also the polarisation of the laser.

For the interaction of the laser light with the material in steps (a), (b) and (d), there should preferably be the following:

1) The wavelength $\lambda$ of the laser is preferably chosen such that the material is essentially transparent at this wavelength (for example in concrete terms: absorption<<10% per mm material depth=>$\gamma$<<1/cm; $\gamma$: Lambert-Beer absorption coefficient).

2) The pulse duration of the laser is preferably chosen such that, within the interaction time, no substantial heat transport (heat diffusion) from the interaction zone can take place (for example in concrete terms: $\tau<<d^2/\alpha$, d: focal diameter, $\tau$ laser pulse duration, $\alpha$: heat diffusion constant of the material).

3) The pulse energy of the laser is chosen preferably such that the intensity in the interaction zone, i.e. in the focal line, produces an induced absorption which leads to local heating of the material along the focal line, which in turn leads to crack formation along the focal line as a result of the thermal stress introduced into the material.

4) The polarisation of the laser influences both the interaction on the surface (reflectivity) and the type of interaction within the material during the induced absorption. The induced absorption can take place via induced, free charge carriers (typically electrons), either after thermal excitation or via multiphoton absorption and internal photoionisation or via direct field ionisation (field strength of the light breaks the electron bond directly). The type of production of the charge carriers can be assessed for example via the so-called Keldysh parameter (reference) which however plays no role in the application of the method according to the invention. In the case of specific (e.g. double-refracting materials), it can be important merely that the further absorption/transmission of the laser light depends upon the polarisation and hence the polarisation should be chosen favourably via suitable lens systems (phase plates) by the user for separation of the respective material, e.g. simply in a heuristic manner. If the substrate material is therefore not optically isotropic but for example double-refracting, then also the propagation of the laser light in the material is influenced by the polarisation. Therefore the polarisation and the orientation of the polarisation vector can be chosen such that, as desired, only one focal line and not two thereof are formed (ordinary and exraordinary beams). This is of no importance in the case of optically isotropic materials.

5) Furthermore, the intensity should be chosen via the pulse duration, the pulse energy and the focal line diameter such that no ablation or melting but only crack formation in the structure of the solid body is effected. This requirement can be fulfilled for typical materials, such as glass or transparent crystals, most easily with pulsed lasers in the sub-nanosecond range, in particular therefore with pulse durations of e.g. between 10 and 100 ps. Above scale lengths of approx. one micrometer (0.5 to 5.0 micrometers), the heat conduction for poor heat conductors, such as for example glasses, acts into the sub-microsecond range, whilst, for good heat conductors, such as crystals and semiconductors, the heat conduction is effective even from nanoseconds onwards.

The essential process for forming the zones of internal damage, i.e. the crack formation in the material which extends vertically relative to the substrate plane, is mechanical stress which exceeds the structural strength of the material (compression strength in MPa). The mechanical stress is achieved here by rapid, non-homogeneous heating (thermally induced stress) due to the laser energy. The crack formation in steps (a), (b) and (d), provided there is corresponding positioning of the substrate relative to the focal line (see subsequently), of course starts on the surface of the substrate since the deformation is greatest there. This is because, in the half-space above the surface, there is no material which can absorb forces. This argument also applies for materials with toughened or prestressed surfaces as long as the thickness of the toughened or prestressed layer is large relative to the diameter of the suddenly heated material along the focal line (see, in this respect, also FIG. 1 which is also described subsequently).

The type of interaction can be adjusted via the fluence (energy density in joules per $cm^2$) and the laser pulse duration with the chosen focal line diameter such that firstly no melting takes place on the surface or in the volume and secondly no ablation takes place with particle formation on the surface.

Subsequently, the production of the contour line of a desired separation surface (relative movement between laser beam and substrate along the contour line on the substrate surface), i.e. step (a), is described. The same applies to (b) and (d).

The interaction with the material produces, per laser pulse, an individual, continuous (viewed in the direction perpendicular to the substrate surface) crack zone in the material along a focal line. For complete separation of the material, a sequence of these crack zones per laser pulse is placed so closely to each other along the desired separation line that a lateral connection of the cracks to form a desired crack surface/contour is produced in the material. For this, the laser is pulsed at a specific train frequency. Spot size and spacing are chosen such that, on the surface along the line of the laser spots, a desired, directed crack formation begins. The spacing of the individual crack zones along the desired separation surface is produced from the movement of the focal line relative to the material within the timespan of laser pulse to laser pulse. See in this respect also FIG. 4 which is also described subsequently.

In order to produce the desired contour line or separation surface in the material, either the pulsed laser light can be moved with an optical arrangement which is moveable parallel to the substrate plane (and possibly also perpendicular thereto) over the stationary material or the material itself is moved past the stationary optical arrangement with a moveable receiving means such that the desired separation line is formed. The orientation of the focal line relative to the surface of the material, whether perpendicular or at an angle>0° relative to the surface normal, can be chosen either to be fixed or it can be changed via a rotatable optical normal arrangement (subsequently also termed lens system for simplification) and/or via a rotatable beam path of the laser along the desired contour line or separation surface or-line.

In total, the focal line for forming the desired separation line can be guided in up to five separately moveable axes through the material: two spatial axes (x, y) which fix the penetration point of the focal line into the material, two angular axes (theta, phi), which fix the orientation of the focal line from the penetration point into the material, and a further spatial axis (z', not necessarily orthogonal to x, y), which fixes how deeply the focal line extends from the penetration point on the surface into the material. For the geometry in the Cartesian coordinate system (x, y, z), see also for example the subsequently described FIG. 3a. In the case of the perpendicular incidence of the laser beam on the substrate surface, z=z' applies.

The final separation of the material (separation of the contour) along the produced contour line is effected either by inherent stress of the material or by introduced forces, e.g. mechanically (tension) or thermally (non-uniform heating/cooling). Since in steps (a), (b) and (d) no material is ablated, there is generally initially no continuous gap in the material but only a highly disrupted fracture surface (microcracks) which are interlocked per se and possibly also connected by bridges. As a result of the forces introduced subsequently in the aftertreatment step, the remaining bridges are separated via lateral (effected parallel to the substrate plane) crack growth and the interlocking is overridden so that the material can be separated along the separation surface.

The laser beam focal line which can be used in (a), (b) and (d) is termed, for simplification previously and subsequently, also focal line of the laser beam. In (a), (b) and (d), the substrate is prepared by the crack formation (induced absorption along the focal line which extends perpendicular to the substrate plane) with the contour line, the crackline portions and the stress-relieving line portion(s) for separation of the contour from the substrate. The crack formation is effected preferably perpendicular to the substrate plane into the substrate or into the interior of the substrate (longitudinal crack formation). As described already, generally a large number of individual laser beam focal lines must be introduced into the substrate along one line (e.g. contour line) on the substrate surface in order that the individual parts of the substrate can be separated from each other. For this purpose, either the substrate can be moved parallel to the substrate plane relative to the laser beam or to the optical arrangement or, conversely, the optical arrangement can be moved parallel to the substrate plane relative to the substrate which is disposed in a stationary manner.

The induced absorption of steps (a), (b) and (d) is advantageously produced such that the crack formation in the substrate structure is effected without ablation and without melting of the substrate material. This takes place by means of adjusting the already described laser parameters, explained subsequently also in the scope of examples, and also the features and parameters of the optical arrangement. The extension 1 of the laser focal line and/or the extension of the portion of the induced absorption in the substrate material (in the substrate interior) respectively, viewed in the beam longitudinal direction, can thereby be between 0.1 mm, preferably between 0.3 mm and 10 mm. The layer thickness of the substrate is preferably between 30 and 3,000 µm, particularly preferred between 100 and 1,000 µm. The ratio l/d of this extension 1 of the laser beam focal line and the layer thickness d of the substrate is preferably between 10 and 0.5, particularly preferred between 5 and 2. The ratio L/D of the extension 1 of the portion of the induced absorption in the substrate material, viewed in the beam longitudinal direction, and of the average extension D of the portion of the induced absorption in the material, i.e. in the interior of the substrate, is preferably, viewed transversely relative to the beam longitudinal direction, between 5 and 5,000, particularly preferred between 50 and 5,000. The average diameter δ (spot diameter) of the laser beam focal line is preferably between 0.5 µm and 5 µm, particularly preferred between 1 µm and 3 µm (e.g. at 2 µm). The pulse duration of the laser should be chosen such that, within the interaction time with the substrate material, the heat diffusion in this material is negligible (preferably no heat diffusion is effected). If the pulse duration of the laser is characterised with τ, then there applies preferably for τ, δ and the heat diffusion constant β of the material of the substrate, $\tau \ll \delta^2/\beta$. This means that τ is less than 1%, preferably less than 1% of $\delta^2/\beta$. For example, the pulse duration τ at 10 ps (or even below that) can be between 10 and 100 ps or even above 100 ps. The pulse repetition frequency of the laser is preferably between 10 and 1,000 kHz, preferably at 100 kHz. The laser can thereby be operated as a single pulse laser or as burst pulse laser. The average laser power (measured on the beam output side of the laser) is preferably between 10 watts and 100 watts, preferably between 30 watts and 50 watts for steps (a), (b) and (d).

In steps (a), (b) and (d), a laser beam is hence moved relative to the substrate surface along a line, along which a large number of individual zones of internal damage are to be introduced into the substrate (also termed extended portions of induced absorption in the interior of the substrate along the respective line). The ratio a/δ of the average spacing a of the centres of immediately adjacent zones of internal damage, i.e. produced directly after each other (portions of induced absorption) and the average diameter δ of the laser beam focal line (spot diameter) is preferably between 0.5 and 3.0, preferably between 1.0 and 2.0 (see in this respect also FIG. 4).

The final separation of the contour from the substrate can be effected by, after steps (a) to (d) (possibly also already during implementation of one of these steps), mechanical forces being exerted on the substrate (for example by means of a mechanical stamp) and/or thermal stresses being introduced into the substrate (for example by means of a $CO_2$ laser) in order to heat and cool again the substrate non-uniformly. As a result, between immediately adjacent extended portions of induced absorption or between immediately adjacent zones of internal damage, a crack formation in order to divide the substrate into a plurality of parts, i.e. for separating the contour can be effected. This crack formation should thereby be understood (in contrast to the depth crack formation induced in the direction of the substrate depth or that in steps (a), (b) and (d), as transverse crack formation, i.e. as a lateral crack formation in the substrate plane (corresponding to the course of the contour line, along which the contour is to be separated from the substrate).

It is thereby essential, in the case of this preferred procedure in steps (a), (b) and (d) that, per laser pulse (or per burst pulse), a laser beam focal line (and not merely a focal point which is not extended or only very locally) is produced. For this purpose, the laser lens systems illustrated also in detail subsequently are used. The focal line thus determines the zone of interaction between laser and substrate. If the focal line falls at least in portions (viewed in the depth direction) into the substrate material to be separated, then the laser parameters can be chosen such that an interaction with the material takes place, which produces a crack zone along the entire focal line (or along the entire extended portion of the laser beam focal line which falls into the substrate). Selectable laser parameters are for example the wavelength of the laser, the pulse duration of the laser, the pulse energy of the laser and also possibly the polarisation of the laser.

As a result of this preparation of the contour separation in steps (a), (b) and (d), it is made possible according to the invention to separate contours made of very thin glass substrates (glass substrates with thicknesses<300 µm, <100 µm or even <50 µm. This is effected without edges, damage, cracks, flaking or the like on the substrate (remains) which are left after separation of the contour so that complex aftertreatments are not required according to the invention. The zones of internal damage along the lines can thereby be introduced at high speeds (>1 m/s).

Further advantageously achievable features of the method according to the invention are described in claims 9 and 10. There is thereby understood by a spiral (claim 10) very much in general (viewed in the substrate plane), a planar linear structure which is wound multiple times within itself and of almost any shape, which structure begins at one point (in the centre of the internal contour) and, with increasing number of windings, approaches the outer edge of the internal contour more and more and hence approximates to the latter (a spiral according to the invention is therefore not restricted to mathematical spirals in the narrower sense).

Claim 11 describes further advantageous features of the invention. Any features can thereby be produced in any combination with each other. The laser properties described in claim 11 apply (provided nothing different is mentioned) likewise for the production and the beam guidance of the material-removing laser beam in the material removal step. With respect to the specific laser parameters in the material removal step which are produced advantageously, see however claim 12.

It is possible to use the types of laser mentioned in claims 11 and 12 as material-removing laser by (in comparison with production of a large number of zones of internal damage with these types of laser) the lens construction being correspondingly adapted: no focal line lens system is used but instead a "normal" lens with e.g. 100 mm focal distance (preferably in the range between 70 mm and 150 mm). A galvanometer scanner set up with F-theta-lens is preferred.

Further possible lasers: Nd:YAG laser with 532 nm/515 nm wavelength. However, also a $CO_2$ laser with 9 to 11 μm wavelength together with a gas nozzle is very suitable.

It can prove to be favourable to vary, between step (a), on the one hand, and step(s) (b) and/or (d), on the other hand, e.g. the spacing between adjacent zones of internal damage. In particular increasing this spacing in step(s) (b) and/or (d) is advantageous compared with step (a) since a favourable crack formation and hence damage in the internal region of an internal contour thus takes place.

Parameters by way of example can be as follows:
For toughened glass (0.7 mm; DOL 40 μm): burst 2 pulses; 200 kHz repetition rate; 3.5 μm pulse spacing; 25 W laser power; numerical aperture lens system 0.1; focal line length 1.8 mm.
For untoughened glass (2.8 mm): burst 5 pulses, 100 kHz repetition rate; 5 μm pulse spacing, 50 W laser power; numerical aperture lens system 0.08; focal line length 2.8 mm.

Advantageous procedures for implementing the material removal step are described in claims 13 and 14. For example a 20-times passage of the removal line for a glass substrate of thickness 0.7 mm is thereby effected in order to cut the removal line into the substrate material over the entire thickness of the substrate material.

In the procedure according to claim 14, beams of all lasers mentioned in the present invention can be used as laser beams, with the exception of a $CO_2$ laser. In particular, a laser wavelength of 532 nm can be used. Polyoxymethylene (POM) can be used as precipitation material.

The mounting of the substrate can be ensured for example with the help of a clamping device with a depression as cavity. By means of the vapour pressure in the gas-sealed cavity, expulsion of the substrate piece separated by means of the separation line and possibly even expulsion of the thereafter still remaining remains of the contour still connected to the substrate is possible.

Claim 15 advantageously describes materials which can be machined with the method according to the invention.

Devices according to the invention which are capable of implementing the methods according to the invention are described in claims 16 to 18.

A laser which is capable, according to claim 18, of generating both the laser beam in steps (a), (b) and (d) and the material-removing laser beam for the material removal step is for example a 50 W picosecond laser.

According to the invention, it can be advantageous for the final separation of the contour to supply moisture to the substrate material after introduction of the large number of zones of internal damage. As a result of capillary forces, water is drawn into the damage zones and can induce stresses by means of linking up with open bonds in the glass structure (caused by the laser), which stresses help finally to form a crack. Hence controlled supply of the cut contours (internal and external contour) with water is possible, the impingement being able to be effected during or after the laser machining. Use of an evaporator in the device for producing a moist airflow and/or use of a moist substrate mounting or receiving means is possible. A water reservoir can be provided in the region of the contour line to be introduced.

The present invention of producing and separating a contour in or from a planar substrate has the following advantages in particular relative to the contour cutting methods known from the state of the art:

By combining the introduction of zones of internal damage, on the one hand (steps (a), (b) and possibly also (d)), and the material removal- and/or material deformation step (c), on the other hand, a very high separation quality can be achieved for contours: practically no break-outs occur, the cut edges on the substrate, after removal of the contour, have very low roughness and also high precision.

Internal contours shaped in almost any way (circular internal contours, oblong hole-shaped internal contours or any free form surfaces) can be separated with great precision according to the invention. A high resolution of structures of the internal contour is thereby possible.

The formation of stress cracks outside the internal contour (i.e. in the remaining substrate) is avoided.

The method is suitable not only for removing internal contours but also for separating external contours, which have very small radii or corners, with very good quality of the produced external edges on the remaining substrate. In particular, external contours which have undercuts (e.g. dovetail-shaped external contours) can be produced and separated with high quality.

Subsequently, the present invention is described with reference to embodiments. The material removal- and/or material deformation step which is implemented here as material removal step is designated here in brief with (c). There are shown:

FIG. 1: The principle of positioning according to the invention of a focal line, i.e. the machining of the substrate material which is transparent for the laser wavelength based on induced absorption along the focal line in steps (a), (b) and (d).

Figure 2:
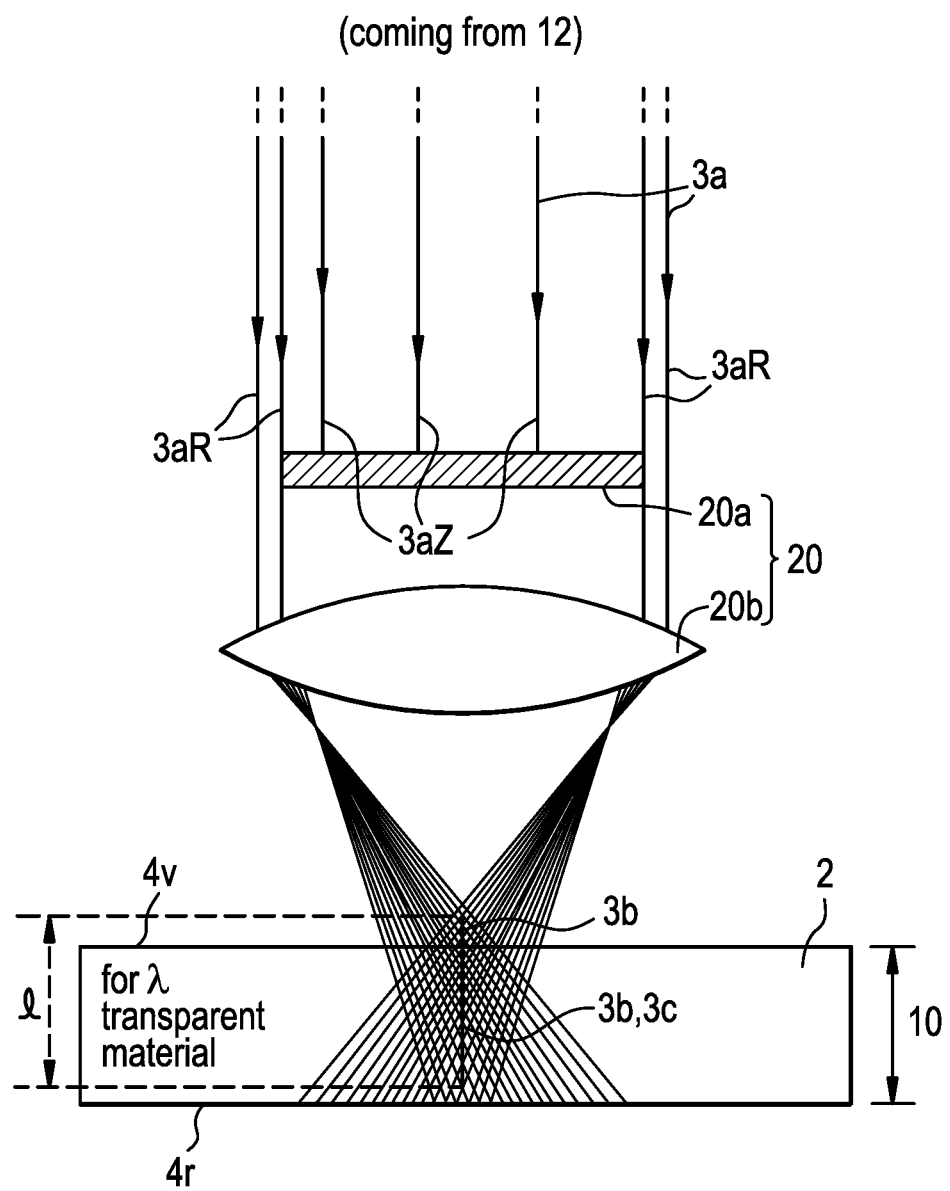

FIG. 2: An optical arrangement which can be used according to the invention for steps (a), (b) and (d).

Figure 3A:
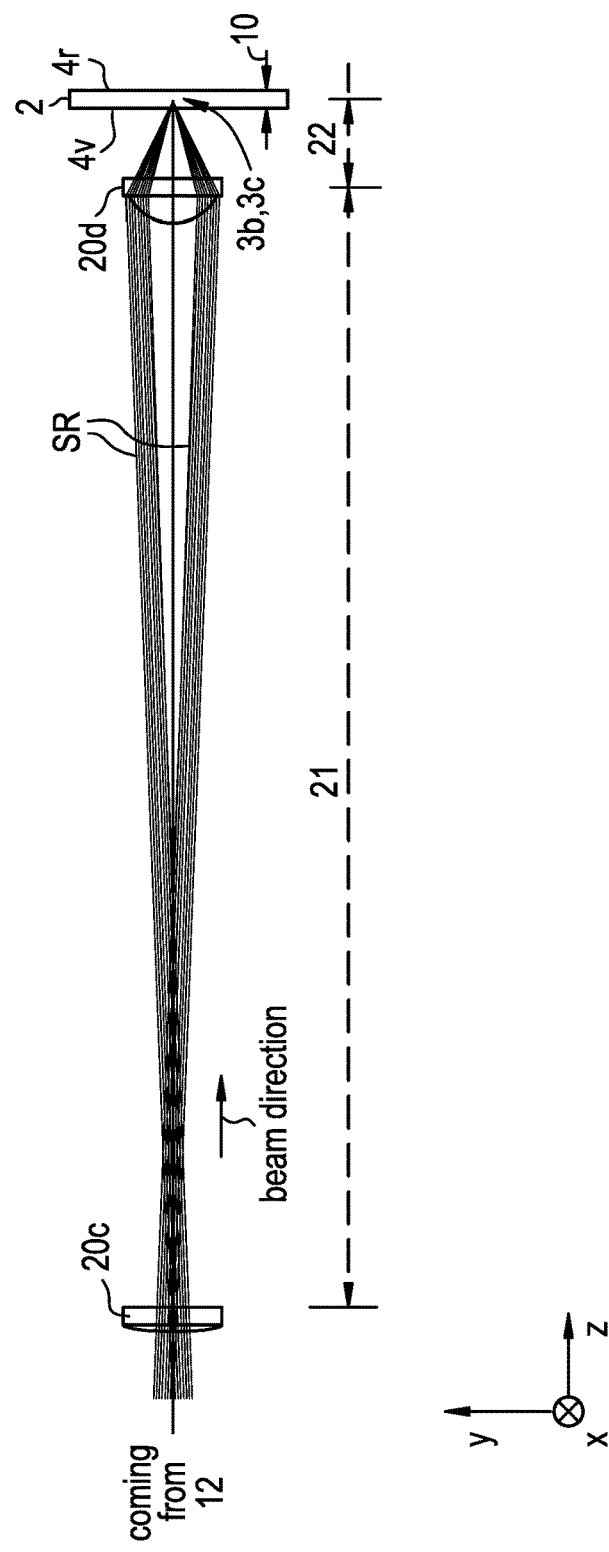

FIGS. 3A and 3B: A further optical arrangement which can be used according to the invention for steps (a), (b) and (d).

FIG. 4: A microscope image of the substrate surface (plan view on the substrate plane) of a glass disc machined according to step (a).

FIGS. 5A to 5D: Steps (a) to (d) which lead to removal of a circular internal contour from a substrate according to the invention.

FIG. 6: An example of step (d) according to the invention in which a stress-relieving spiral is produced as stress-relieving line portion.

FIG. 7: An example of separation according to the invention of an external contour from a substrate.

Figure 8A:
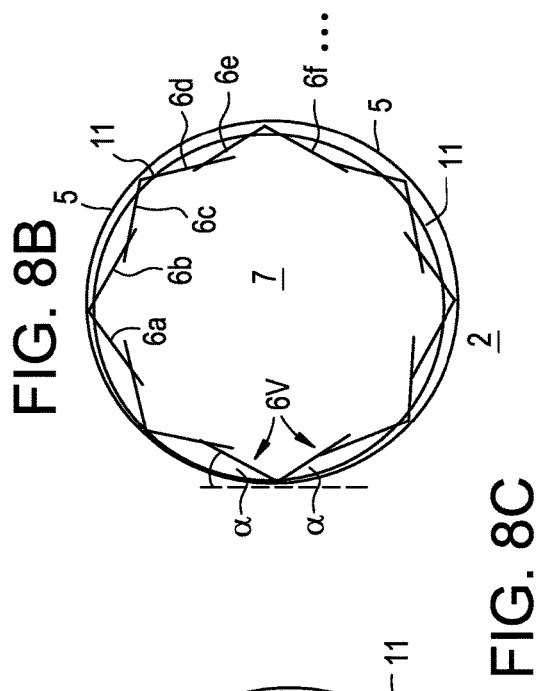
Figure 8B:
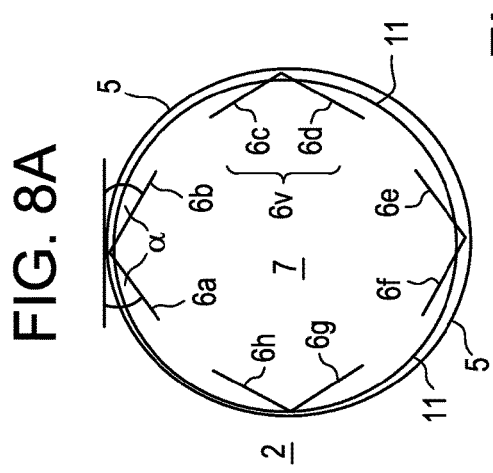
Figure 8C:
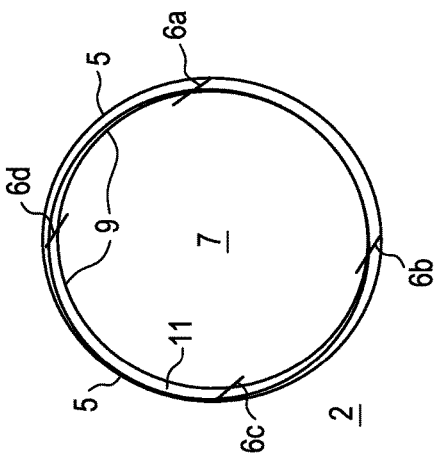

FIGS. 8A to 8C: Examples of different cut guidances for removing a circular internal contour.

FIGS. 9A and 9B: An example for implementing a material removal step.

FIG. 10: A sketch of a device according to the invention for producing and separating contours.

Figure 1B:
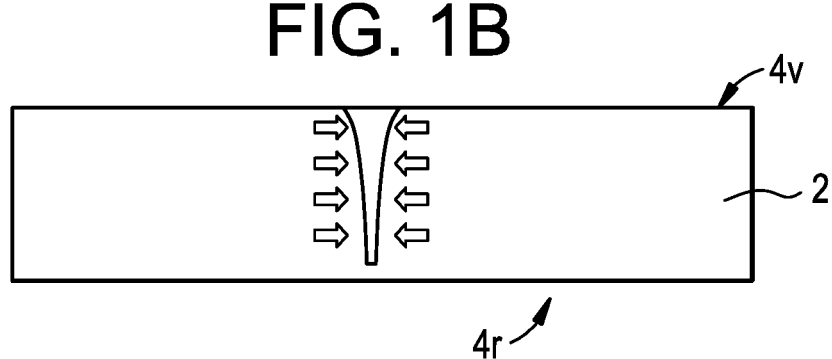

FIGS. 1A and 1B outline the basic procedure of steps (a), (b) and (d). A laser beam 3 which is emitted by the laser 12 (FIG. 10), not shown here, and which is designated on the beam input side of the optical arrangement 20 with the reference number 3a, is beamed onto the optical arrangement 20 of the invention. The optical arrangement 20 forms, from the radiated laser beam, on the beam output side over a defined extension region along the beam direction (length l of the focal line), an extended laser beam focal line 3b. Covering the laser beam focal line 3b of the laser radiation 3 at least in portions, the planar substrate 2 to be machined is positioned in the beam path after the optical arrangement. The reference number 4v designates the surface of the planar substrate orientated towards the optical arrangement 20 or the laser, the reference number 4r designates the rear-side surface of the substrate 2 which is normally parallel hereto and at a spacing therefrom. The substrate thickness (perpendicular to the surfaces 4v and 4r, i.e. measured relative to the substrate plane) is designated here with the reference number 10.

As FIG. 1A shows, the substrate 2 here is orientated perpendicular to the beam longitudinal axis and hence to the focal line 3b which is produced in space by the optical arrangement 20 behind the same (the substrate is perpendicular to the drawing plane) and, viewed along the beam direction, is positioned relative to the focal line 3b such that the focal line 3b, viewed in the beam direction, begins in front of the surface 4v of the substrate and ends in front of the surface 4r of the substrate, i.e. still inside the substrate. The extended laser beam focal line 3b hence produces (with suitable laser intensity along the laser beam focal line 3b which is ensured by the focusing of the laser beam 3 on a portion of the length l, i.e. through a line focus of length l) in the overlapping region of the laser beam focal line 3b with the substrate 2, i.e. in the material of the substrate which is covered by the focal line 3b, an extended portion 3c, viewed along the beam longitudinal direction, along which an induced absorption in the material of the substrate is produced, which induces a crack formation in the material of the substrate along the portion 3c. The crack formation is thereby effected not only locally but over the entire length of the extended portion 3c of the induced absorption (i.e. the zone of internal damage). The length of this portion 3c (i.e. ultimately the length of the overlapping of the laser beam focal line 3b with the substrate 2) is provided here with the reference number L. The average diameter or the average extension of the portion of the induced absorption (or of the regions in the material of the substrate 2 which are subjected to the crack formation) is designated here with the reference number D. This average extension D corresponds essentially here to the average diameter δ of the laser beam focal line 3b.

As FIG. 1A shows, substrate material which is transparent for the wavelength λ of the laser beam 3 is hence heated according to the invention by induced absorption along the focal line 3b. FIG. 1B shows that the heated material ultimately expands so that a correspondingly induced stress leads to the microcrack formation according to the invention, the stress being greatest on the surface 4v.

Subsequently, concrete optical arrangements 20 which can be used for producing the focal line 3b and also a concrete optical construction (FIG. 10) in which these optical arrangements can be used are described. All arrangements or constructions are thereby based on the above-described ones so that respectively identical reference numbers are used for components or features which are identical or correspond in their function. Subsequently, respectively only the differences are therefore described.

Since the separation surface leading ultimately to the separation is or should be of high quality according to the invention (with respect to breaking strength, geometric precision, roughness and avoidance of aftertreatment requirements), the individual focal lines 5-1, 5-2, . . . which are to be positioned along for example the contour line 5 on the surface of the substrate are produced as described with the subsequent optical arrangements (the optical arrangement is subsequently also termed alternatively laser lens system). The roughness is thereby produced in particular from the spot size or from the spot diameter of the focal line. In order to be able to achieve, with a given wavelength λ of the laser 12 (interaction with the material of the substrate 2), a low spot size of for example 0.5 µm to 2 µm, generally specific requirements are placed on the numerical aperture of the laser lens system 20. These requirements are fulfilled by the subsequently described laser lens systems 20.

In order to achieve the desired numerical aperture, the lens system must have, on the one hand, the required opening at a given focal distance, according to the known formulae of Abbé (N.A.=n sin (theta), n: refractive index of the glass to be machined, theta: half the opening angle; and theta=arctan (D/2f); D: opening, f: focal distance). On the other hand, the laser beam must illuminate the lens system up to the required opening, which is effected typically by beam expansion by means of expanding telescopes between laser and focusing lens system.

The spot size should thereby not vary too greatly for a uniform interaction along the focal line. This can be ensured for example (see embodiment below) by the focusing lens system being illuminated only in a narrow, annular region by the beam then opening and hence the numerical aperture of course changing only slightly as a percentage.

According to FIG. 2 (cut perpendicular to the substrate plane at the level of the central beam in the laser beam bundle of the laser radiation 12; here also, radiation of the laser beam 3 is effected perpendicular to the substrate plane so that the focal line 3b or the extended portion of the induced absorption 3c is parallel to the substrate normal), the laser radiation 3a emitted by the laser 3 is directed firstly onto a circular diaphragm 20a which is completely non-transparent for the laser radiation used. The diaphragm 20a is thereby orientated perpendicular to the beam longitudinal axis and centred on the central beam of the illustrated beam bundle 3a. The diameter of the diaphragm 20a is chosen such that the beam bundles (designated here with 3aZ) which are situated close to the centre of the beam bundle 3a or of the central beam impinge on the diaphragm and are absorbed completely by the latter. Merely beams situated in the external circumferential region of the beam bundle 3a (edge beams, designated here with 3aR) are not absorbed on the basis of the diaphragm size which is reduced in comparison with the beam diameter but rather pass through the diaphragm 20a at the side and impinge on the edge regions of the focusing optical element of the optical arrangement 20 which is configured here as a spherically ground, bi-convex lens 20b.

The lens 20b centred on the central beam is configured here deliberately as uncorrected, bi-convex focusing lens in the form of a normally spherically ground lens. In other words, the spherical aberration of such a lens is deliberately made use of. As an alternative thereto, aspherical lenses or multilenses which deviate from ideally corrected systems and have in fact no ideal focal point but rather form a pronounced longitudinally extended focal line of a defined length can be used (i.e. lenses or systems which have in fact no longer any individual focal point). The zones of the lens hence focus precisely as a function of the spacing from the centre of the lens along a focal line 3b. The diameter of the diaphragm 20a transversely relative to the beam direction is here approx. 90% of the diameter of the beam bundle (beam bundle diameter defined by the extension up to reduction to 1/e) and approx. 75% of the diameter of the lens of the optical arrangement 20. According to the invention, hence the focal line 3b of a non-aberration-corrected spherical lens 20 is used and was produced by stopping down the beam bundles in the centre. The section is represented in a plane through the central beam, the complete three-dimensional bundle is produced if the represented beams are rotated about the focal line 3b.

An improved optical arrangement 20 which can be used according to the invention is produced if this comprises both an axicon and a focusing lens.

FIG. 3A shows such an optical arrangement 20 in which, viewed in the beam path of the laser 12 along the beam direction, firstly a first optical element with a non-spherical free surface which is shaped to form an extended laser beam focal line 3 b is positioned. In the illustrated case, this first optical element is an axicon 20c with 5° cone angle which is positioned perpendicular to the beam direction and centred on the laser beam 3. An axicon or cone prism is a special, conically ground lens which forms a point source on a line along the optical axis (or even annularly transforms a laser beam). The construction of such an axicon is basically known to the person skilled in the art; the cone angle here is for example 10°. The cone tip of the axicon thereby points in the opposite direction to the beam direction. In the beam direction at the spacing 21 from the axicon 20c, a second, focusing optical element, here a plano-convex lens 20b (the curvature of which points towards the axicon) is positioned. The spacing 21 at approx. 300 mm is chosen here such that the laser radiation formed by the axicon 20c impinges annularly on the externally situated regions of the lens 20d. The lens 20d focuses the annularly impinging radiation, on the beam output-side, at a spacing 22 of here approx. 20 mm from the lens 20d onto a focal line 3b of a defined length of here 1.5 mm. The effective focal distance of the lens 20d is here 25 mm. The annular transformation of the laser beam due to the axicon 20c is provided here with the reference number SR.

FIG. 3B shows the configuration of the focal line 3b or of the induced absorption 3c in the material of the substrate 2 according to FIG. 3A in detail. The optical properties of the two elements 20c, 20d and also the positioning of the same is effected here such that the extension I of the focal line 3b in the beam direction corresponds exactly to the thickness 10 of the substrate 2. Correspondingly, exact positioning of the substrate 2 along the beam direction is necessary in order, as shown in FIG. 3B, to position the focal line 3b exactly between the two surfaces 4v and 4r of the substrate 2.

According to the invention, it is hence advantageous if the focal line is formed at a specific spacing of the laser lens system and if the large part of the laser radiation is focused up to a desired end of the focal line. This can be achieved, as described, by a mainly focusing element 20d (lens) being illuminated only annularly on a desired zone, as a result of which the desired numerical aperture, on the one hand, and hence the desired spot size is produced, however, on the other hand, loses intensity after the desired focal line 3b of the dispersing circle over a very short distance in the centre of the spot since an essentially annular spot is formed. Hence the crack formation, in the sense of the invention, is stopped inside a short distance at the desired depth of the substrate. A combination of axicon 20c and focusing lens 20d fulfils this requirement. The axicon 20c hereby acts in two ways: by means of the axicon 20c, a usually round laser spot is transmitted annularly towards the focusing lens 20d and the asphericality of the axicon 20c has the effect that, instead of a focal point in the focal plane of the lens, a focal line outside the focal plane is formed. The length l of the focal line 3b can be adjusted via the beam diameter on the axicon 20c. The numerical aperture along the focal line can be adjusted in turn via the spacing 21 between the axicon 20c and the lens 20d and via the cone angle of the axicon 20c. In this way, the entire laser energy can hence be concentrated in the focal line 3b.

Should the crack formation (in the zone of internal damage) stop, in the sense of the invention, apart from the exit side of the substrate, then the annular illumination still continues to have the advantage that, on the one hand, the laser power is used as well as possible since a large part of the laser light remains concentrated at the desired length of the focal line and, on the other hand, by means of the annular illuminated zone together with the desired aberration adjusted by the other optical functions, a uniform spot size along the focal line can be achieved and hence a uniform separation process according to the invention along the focal line.

Instead of the plano-convex lens 20b illustrated in FIG. 3A, also a focusing meniscus lens or another more highly corrected focusing lens (aspherical, multilenses) can be used.

Borosilicate- or soda lime glasses 2 without other colouration (in particular with a low iron content) are optically transparent from approx. 350 nm to approx. 2.5 µm. Glasses are generally poor heat conductors, for which reason laser pulse durations of a few nanoseconds do not in fact allow any substantial heat diffusion out of a focal line 3b. Nevertheless, even shorter laser pulse durations are advantageous since, with sub-nanosecond- or picosecond pulses, a desired induced absorption can be achieved more easily via non-linear effects (intensity substantially higher).

For separation of planar glasses according to the invention, for example a commercially available picosecond laser 12 which has the following parameters is suitable: wavelength 1,064 nm, pulse duration of 10 ps, pulse repetition frequency of 100 kHz, average power (measured directly after the laser) of up to 50 W. The laser beam firstly has a beam diameter (measured at 13% of the peak intensity, i.e. $1/e^2$ diameter of a Gaussian beam bundle) of approx. 2 mm, the beam quality is at least $M^2<1.2$ (determined according to DIN/ISO 11146). With a beam expanding lens system (commercially available beam telescope according to Kepler), the beam diameter can be increased by the factor 10 to approx. 20-22 mm. With a so-called annular diaphragm 20a of 9 mm diameter, the inner part of the beam bundle is stopped down so that an annular beam is formed. With this annular beam, e.g. a plano-convex lens 20b with 28 mm focal distance (quartz glass with radius 13 mm) is illuminated. By means of the strong (desired) spherical aberration of the lens 20b, the focal line according to the invention is produced.

The theoretical diameter δ of the focal line varies along the beam axis, for this reason it is advantageous for the production of a homogeneous crack surface if the substrate thickness 10 is less here than approx. 1 mm (typical thicknesses for display glasses are 0.5 mm to 0.7 mm). With a spot size of approx. 2 µm and a spacing of spot to spot of 5 µm, a speed of 0.5 m/sec is produced, with which the focal line can be guided over the substrate 2 along the contour line 5 (cf. FIG. 4). With 25 W average power on the substrate (measured following the focusing line 7), there results from the pulse train frequency of 100 kHz, a pulse energy of 250 µJ which can also be effected in a structured pulse (rapid train of individual pulses at a spacing of only 20 ns, so-called burst pulse) of 2 to 5 sub-pulses.

Untoughened glasses essentially have no internal stresses, for which reason the disruption zone which is still interlocked and connected by unseparated bridges still at first holds the parts together without external effect. If however a thermal stress is introduced, the contour 1 is finally completely separated and without further external introduction of force from the substrate 2. For this purpose, a $CO_2$ laser with up to 250 W average power is focused on a spot size of approx. 1 mm and this spot is guided at up to 0.5 m/s over the contour line 5, the crack lines 6 and possibly also the stress-relieving line 11 (cf. FIGS. 5A to 5D). The local thermal stress due to the introduced laser energy (5 J per cm of the lines) separates the contour 1 completely.

For separation in thicker glasses, the threshold intensity for the process (induced absorption and formation of a disruption zone by thermal shock) must of course be achieved via a longer focal line 3b. Hence higher required pulse energies follow and higher average powers. With the above-described lens system construction and the maximum available laser power (after losses due to the lens system) of 39 W on the substrate 2, the separation of approx. 3 mm thick glass is achieved. On the one hand, the annular diaphragm 20a is thereby removed and, on the other hand, the spacing of lens 20b to substrate 2 is corrected (nominal focal spacing increases in direction) such that a longer focal line 3b is produced in the substrate 2.

Subsequently, a further embodiment for separating toughened glass is presented.

Sodium-containing glasses are toughened by sodium being exchanged for potassium on the glass surface by immersion in liquid potassium salt baths. This leads to a considerable internal stress (compression stress) in a 5-50 μm thick layer on the surfaces, which in turn leads to higher stability.

Basically, the process parameters during separation of toughened glasses are similar to those with untoughened glasses of a comparable dimension and composition. However, the toughened glass can shatter very much more easily as a result of the internal stress and in fact as a result of undesired crack growth which is effected not along the lasered intended fracture surface 5 but into the material. For this reason, the parameter field for successful separation of a specific toughened glass is specified more tightly. In particular the average laser power and the associated cutting speed must be maintained very exactly and in fact as a function of the thickness of the toughened layer. For a glass with 40 μm thick toughened layer and 0.7 mm total thickness, there results with the above-mentioned construction for example the following parameters: cutting speed of 1 m/s at 100 kHz pulse train frequency, therefore a spot spacing of 10 μm, with an average power of 14 W. In addition, the step sequence (a) to (c) (preferably with (d)) for such glasses is particularly crucial in order to prevent undesired cracks and destruction in the remaining substrate 2.

Very thin toughened glasses (<100 μm) consist predominantly of tempered material, i.e. front- and rear-side are for example respectively 30 μm sodium-depleted and hence toughened and only 40 μm in the interior are untoughened. This material shatters very easily and completely if one of the surfaces is damaged. Such toughened glass films have to date not been machinable in the state of the art but are with the presented method.

Separation of this material according to the method of the invention is successful if a) the diameter of the focal line is very small, e.g. less than 1 μm, b) the spacing from spot to spot is low, e.g. between 1 and 2 μm, and c) the separation speed is high enough so that the crack growth cannot run ahead of the laser process (high laser pulse repetition frequency, e.g. 200 kHz at 0.2 to 0.5 m/s).

FIG. 4 shows a microscopic image of the surface of a glass disc machined according to the invention according to step (a). The individual focal lines or extended portions of induced absorption 3c along the contour line 5 which are provided here with the reference numbers 5-1, 5-2, . . . (into the depth of the substrate perpendicular to the illustrated surface) are connected along the line 5, along which the laser beam was guided over the surface 4v of the substrate, to form a separation surface by crack formation for separation of the substrate parts which is effected via the further steps according to the invention. Readily seen is the large number of individual extended portions of induced absorption 5-1, 5-2, . . . , the pulse repetition frequency of the laser, in the illustrated case, having been coordinated to the feed speed for moving the laser beam over the surface 4v such that the ratio a/δ of the average spacing a of immediately adjacent portions 5-1, 5-2, . . . and of the average diameter δ of the laser beam focal line is approx. 2.0.

FIGS. 5A-5D show, by way of example, the machining according to the invention of a 0.7 mm thick glass substrate 2 in plan view on the substrate plane.

Figure 5A:
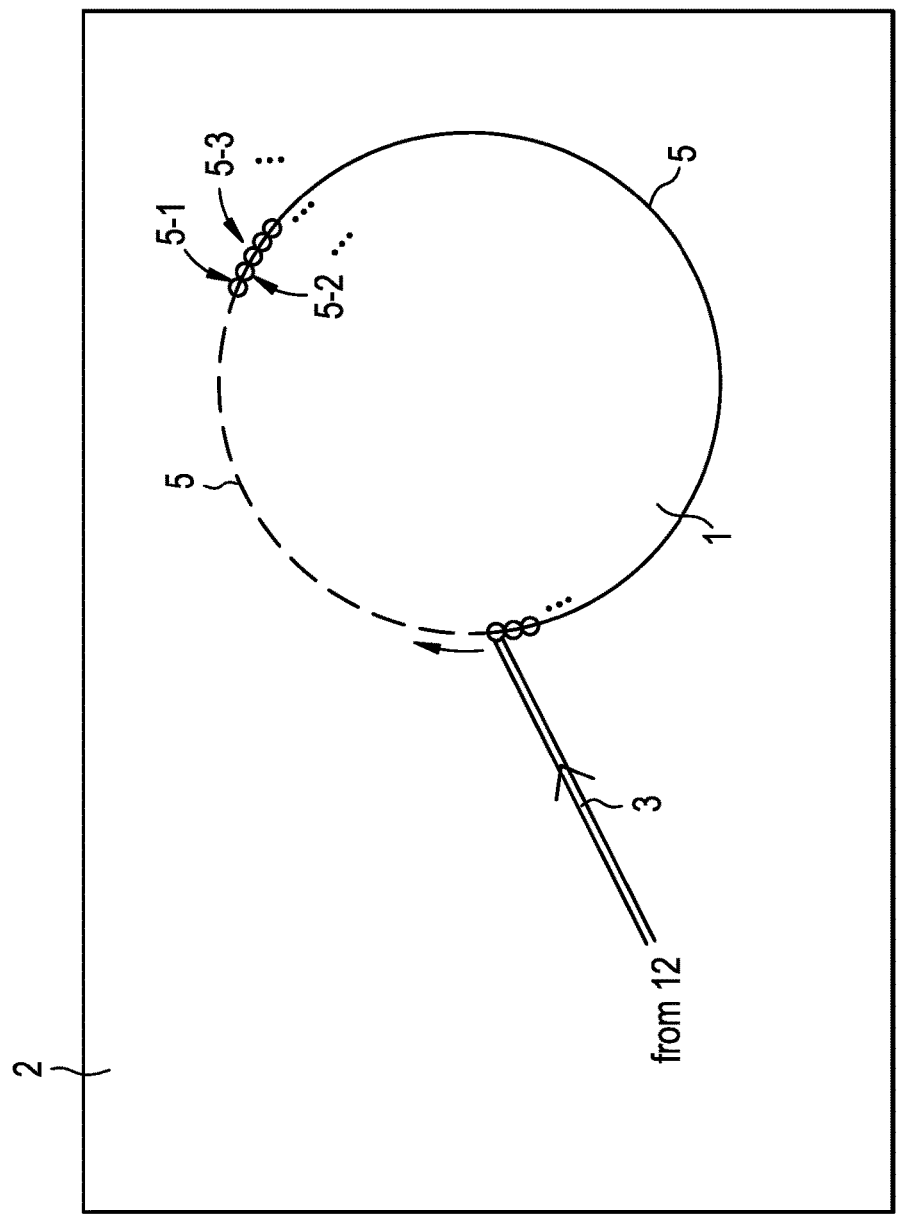

As FIG. 5A shows, in the contour definition step (a), the laser beam 3 of a Nd:YAG laser with a wavelength lambda of 1,064 μm (the laser 12 is not shown here) is radiated vertically onto the substrate plane and guided along the contour line 5 which characterises the contour 1 to be produced. The contour 1 to be produced is here a circular internal contour which is intended to be removed from the substrate 2. The aim of the machining is hence the production of an exactly circular hole in the substrate 2. The circular internal contour 1 or the substrate material of the same can be destroyed during method steps (a) to (d) since the remaining substrate portions 2 represent the desired production product.

As FIG. 5A shows, due to the pulse operation of the laser 12 by means of the laser beam 3 along the contour line 5, a large number of individual zones 5-1, 5-2, . . . of internal damage is produced in the substrate material (portions of induced absorption along a portion which is extended, viewed in the beam direction, of the laser beam focal line produced by means of the laser 12). The individual zones 5-1, 5-2, . . . of internal damage are thereby produced as described for FIG. 4 (this applies also to the steps (d) and (b) which are also described subsequently).

After such zones of internal damage 5-1, 5-2, . . . have been produced over the entire circle circumference 5, a fracture line corresponding to the internal contour 1 to be separated has in fact been produced in the substrate, however the material of the internal contour 1, as described already, is not yet completely separated from the material of the remaining substrate portion 2. The further steps (b) to (d) now serve to separate completely the material of the internal contour 1 from the substrate 2 such that any damage (such as cracks, flaking and the like) in the remaining substrate material are avoided.

Figure 5B:
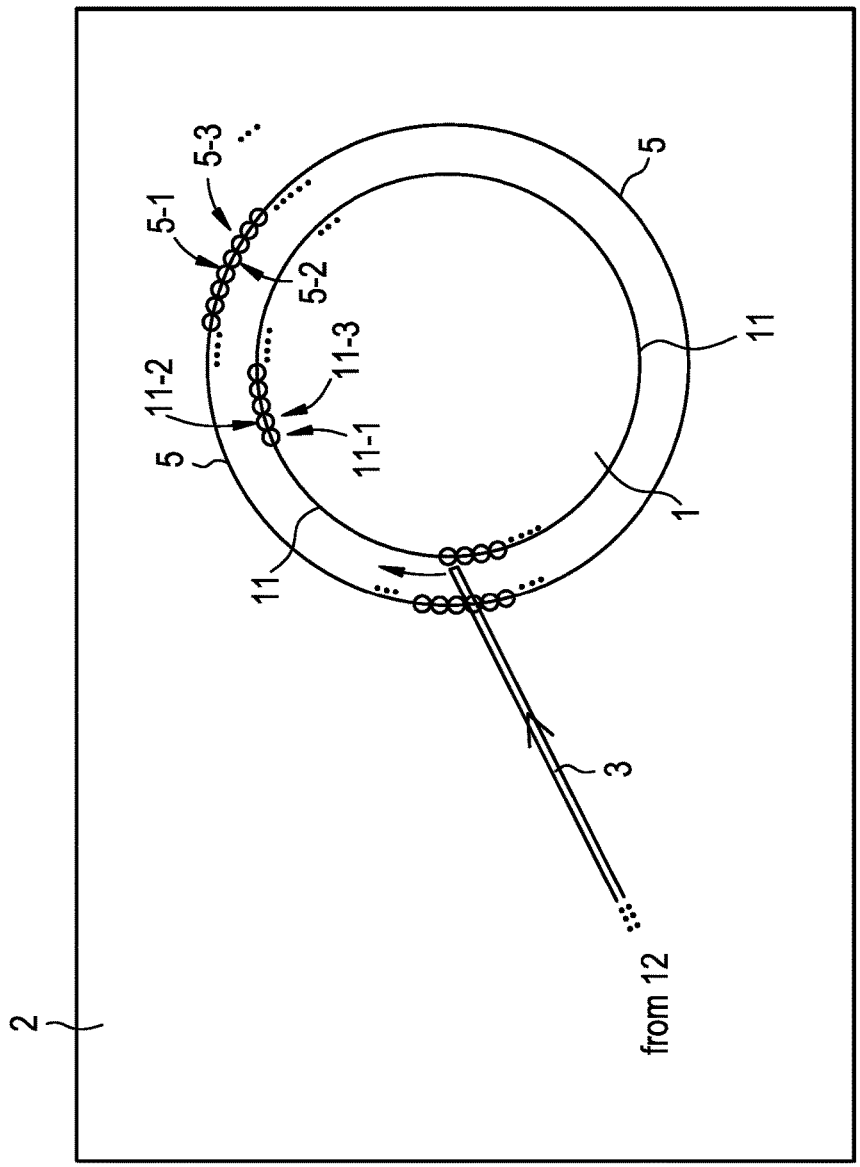

In order to achieve this, there is introduced firstly, in a stress-relieving step (d) subsequent to step (a), cf. FIG. 5B (in which the features already described in FIG. 5A are provided with identical reference numbers; this then also applies to the subsequent FIGS. 5C and 5D), a stress-relieving line portion 11 which approximates to the course of the contour line 5 (here by a constant spacing from the latter), is introduced concentrically within the contour line 5 and at a spacing from the latter, i.e. in the material of the internal contour 1. Introduction of the stress-relieving line portion 11 which is likewise circular here is thereby effected by means of the laser 12 with the same laser parameters as for the contour line 5 so that, along the complete circular circumference of the portion 11, respectively a large number of individual zones 11-1, 11-2, . . . of internal damage is produced in the substrate material. The introduction of these zones 11-1, 11-2, . . . is also effected as described for FIG. 4.

This step (d) serves to produce a stress reduction, i.e. latent stresses in the substrate material introduced during introduction of the contour line could otherwise lead to tearing of the entire substrate in the case of small contour radii and highly tempered glasses. This can be prevented by the additional cut of step (d) which is not however an absolute necessity. This step can have a spiral as shape but can also be configured as "circle-within-circle" which approximates to the contour line. The aim of this cut is to minimise the spacing of the stress-relieving line portion 11 relative to the target contour in order to leave behind as little material as possible and therefore to enable or to promote self-detachment. For example, values for the maximum approximation of the stress-relieving line portion 11 to the contour line 5 are here approx. 20 µm to 50 µm.

Figure 5C:
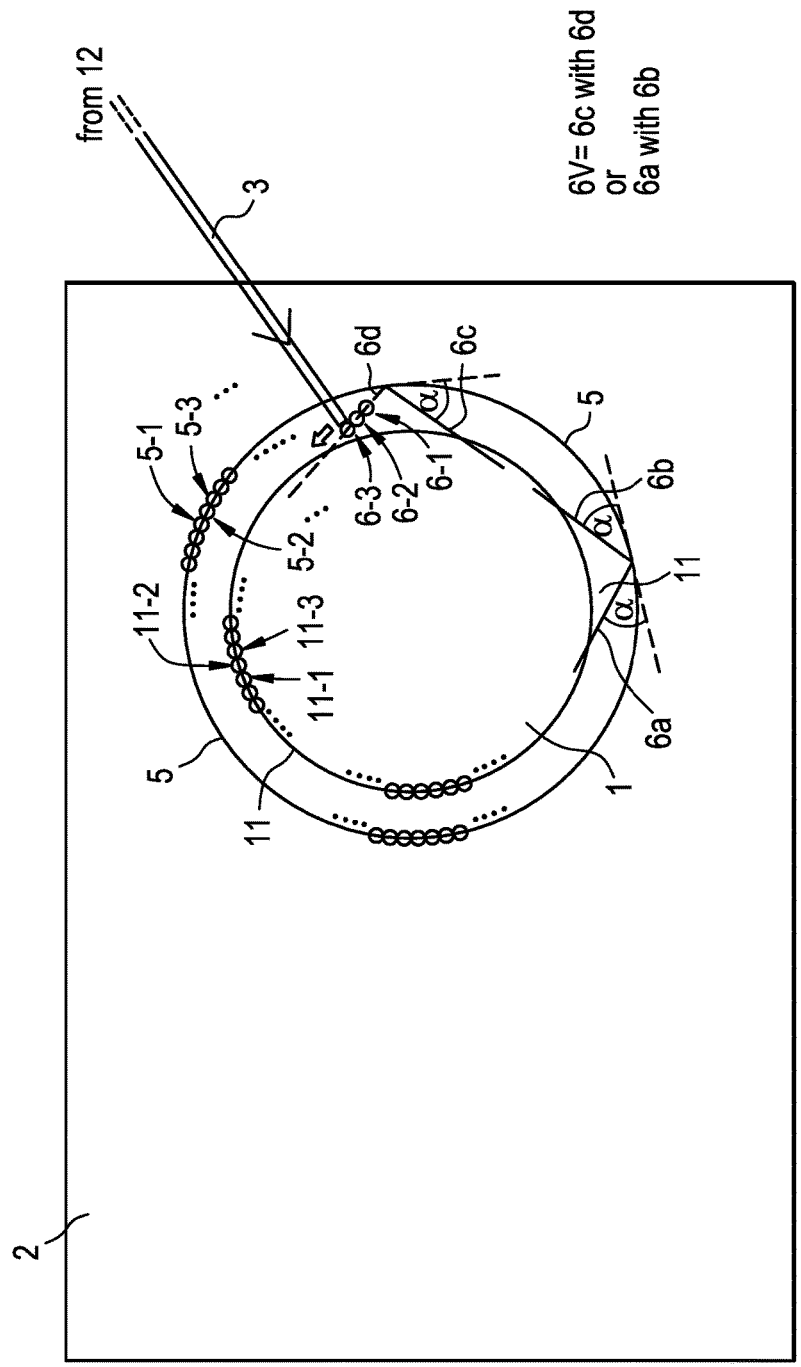

FIG. 5C shows the crack definition step (b) implemented according to the invention after the stress-relieving step (d). In this step, the laser beam 3 of the laser 12 is guided, just as in steps (a) and (d), over the substrate surface or the internal contour surface so that, here also, a large number of individual zones 6-1, 6-2, . . . of internal damage is introduced, as shown in FIG. 4, along the structures 6 inscribed into the internal contour 1.

As FIG. 5 shows, there are produced, in addition, a plurality of linear crack line portions 6a, 6b, . . . which begin at a place on the contour line 5, lead away from the contour line 5 respectively at an angle α of here 25° and lead into the contour 1 to be separated. Respectively exactly two crack line portions (for example the crack line portions 6a and 6b) thereby begin at one and the same place on the contour line 5 and extend in oppositely situated directions respectively at the angle α into the inner contour 1 until they cut the previously introduced stress-relieving line portion 11. The angle α is here the angle between the tangent to the contour line 5 at that place at which the two crack line portions, which lead from this place, in essentially opposite directions, into the material of the internal contour 1 (for example the portions 6a and 6b or also the portions 6c and 6d), begin, and the tangent to the respective crack line portion at this place (or the crack line portion itself since this coincides with the tangent thereof).

In the above-described way, there is produced, along the entire circumference of the contour line 5, a plurality of V-shaped crack lines 6V which consist respectively of precisely two crack line portions which begin at one and the same place on the contour line 5, lead away from the contour line 5 over the surface portions of the internal contour 1 which are situated between said contour line and the stress-relieving line portion 11, cut the stress-relieving line portion 11 and lead into the region of the internal contour 1 situated within the stress-relieving line portion 11. Both legs of one and the same V-shaped crack line 6V thereby lead along the tangent to the contour line 5 at the place of the tip of the respective crack line, viewed symmetrically to the normal, towards this tangent, i.e. on both sides of the normal, into the internal contour 1. Smaller angles α of for example α=10° or even larger angles of for example a α=35° are possible according to the circular circumference of the lines 5 and 11 and also the spacing of these two circular lines from each other.

The crack line portions 6a, 6b, . . . need not thereby definitely, even if this is preferred, begin immediately at one place on the contour line 5 but rather can begin also slightly at a spacing from the contour line 5 at a place situated within the internal contour material 1 and can be guided beyond the stress-relieving line portion 11 into the material portion situated within the same (the angle α between the imaginary continued cut line of the respective crack line portion with the contour line 5, on the one hand, and the tangent to the contour line 5, on the other hand, is then calculated).

In the above-described way, preferably five to ten V-shaped crack lines along the circumference of the circular lines 5, 11 are produced.

The crack lines 6V or the crack line portions 6a, 6b, . . . of the same are thereby placed and orientated preferably such that the detachment behaviour is improved during and/or after the material-removing laser step (c). The material ring remaining after the material-removing laser step (c) is specifically segmented such that individual segments of the circular ring can be detached more easily. It is attempted to build up an internally directed stress into the V cuts so that the partial segments after the material-removing laser step (c) are pressed inwards as far as possible by themselves. These V cuts are not however not an absolute necessity since the method according to the invention can also function without these.

It is hence essential that some of the ring material portions which are inscribed with the V-shaped crack lines into the material of the circular ring portion between the two structures 5 and 11 (here: the approximately triangular portions between the two legs of one and the same V-shaped crack line) could move towards the centre of the internal contour 1 (if they were already completely detached by means of the zones 6-1, 6-2, . . . ) without interlocking with adjacent ring material portions.

Figure 5D:
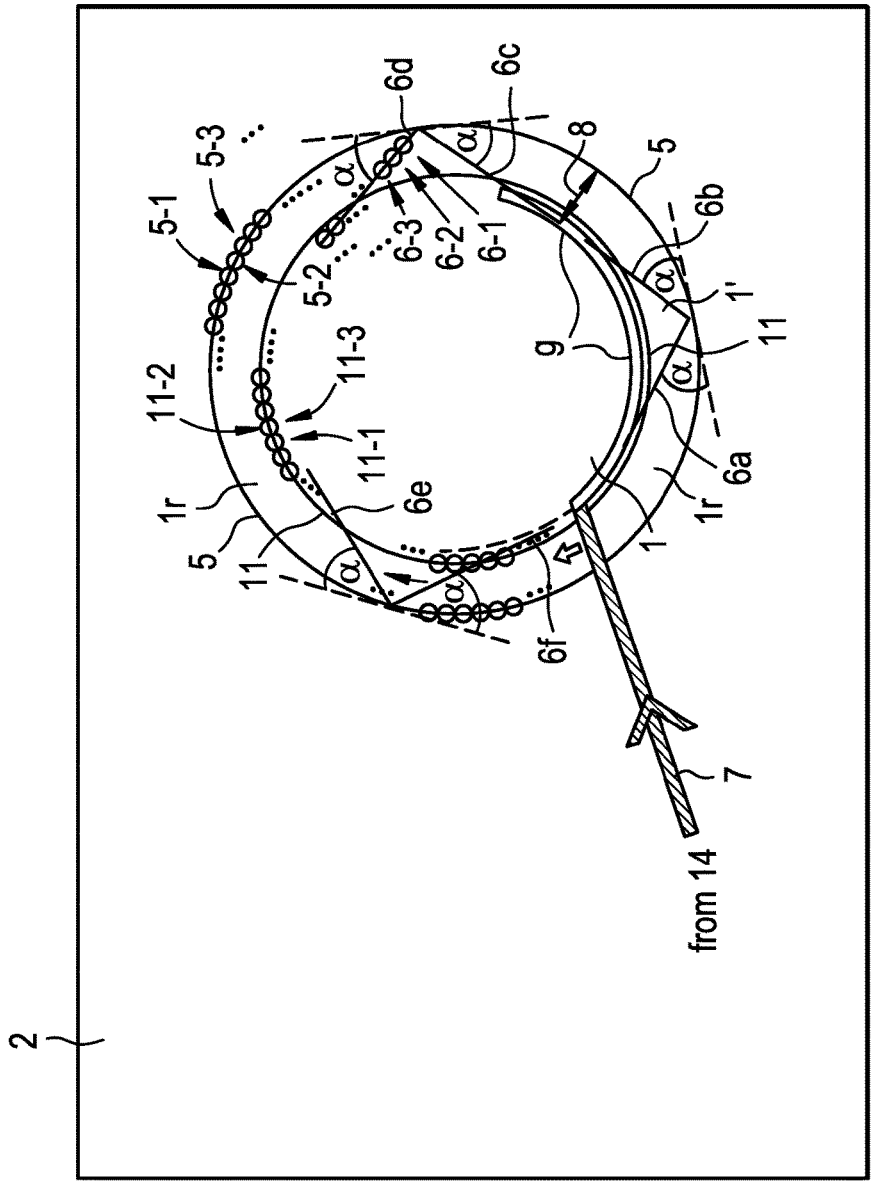

FIG. 5D finally shows the material removal step (c) after the crack definition step (b). (In FIG. 5D, merely three of the V-shaped crack lines introduced in step (b) are illustrated for reasons of clarity).

In step (c), a material-removing laser beam 7 produced by a laser 14, not shown here, is directed towards the substrate surface. In comparison with introduction of the large number of zones of internal damage in steps (a), (b), (d), as described for FIG. 4, the parameters of the material-removing laser beam 7 differ from the laser beam 3 as follows: a point focus or point damage with accompanying material removal is applied. Wavelength: between 300 nm and 11,000 nm; particularly suitable 532 nm or 10,600 nm. Pulse durations: 10 ps, 20 ns or even 3,000 µs.

As FIG. 5D shows, with the laser beam 7 within the stress-relieving line portion 11, a removal line 9 which extends here likewise annularly and along the entire circumference of the contour circle 5 or of the stress-relieving line circle 11 (shown here merely in sections) is inscribed into the material of the internal contour 1. In the radial direction (viewed towards the centre of the internal contour 1), the spacing of the removal line 9 from the stress-relieving line 11 is here approx. 25% of the spacing of the stress-relieving line 11 from the outwardly situated contour line 5. The spacing 8 of the removal line 9 from the contour line 5 is hence 1.25 times the spacing of the stress-relieving line 11 from the contour line 5. The removal line 9 is thereby introduced such that it still cuts (viewed from the centre of the internal contour 1) the inwardly situated ends of the crack line portions 6a, 6b, . . . .

After introducing the removal line along the entire circumference of the contour line 5 or of the stress-relieving line 11, the material portions situated inside the removal line 9 in the centre of the internal contour 1 are detached from the substrate 2 since, along the removal line 9, the substrate material is removed over the entire substrate thickness 10 (cf. FIG. 9). Hence there remain of the internal contour material 1 to be separated merely the ring portions situated between the removal line 9 and the contour line 5.

Between the edge at the removal line 9, on the one hand, and the contour line 5, on the other hand, approximately triangular ring portions are produced between the two legs of each V-shaped crack line (see reference number 1') which are in fact interlocked still with the material of adjacent ring portions (and are characterised here as contour remains still to be separated and have the reference number 1r) but are able to be removed inwards without introducing stresses which possibly damage the material of the remaining substrate 2.

In the aftertreatment step which is not shown here (implemented after steps (a) to (d)), the remaining undesired contour remains 1r (which also comprise the stress-relieving portions 1') are separated from the remaining substrate 2 by means of a mechanical stamp which is moveable perpendicular to the substrate plane.

FIG. 6 shows an alternative form of introducing a stress-relieving line portion 11 into the substrate material of the internal contour 1 of FIG. 5A to be separated. Instead of a single circumferential, circular stress-relieving line portion 11, also a stress-relieving spiral 11S which approximates to the course of the contour line 5, is guided from the centre of the internal contour 1, viewed radially outwards, wound within itself and turning approx. 3.5 times here can be inscribed into the material of the internal contour 2 to be separated.

As FIG. 7 shows, the present invention can be used not only for separating closed internal contours 1 from a substrate 2 but also for separating complexly-shaped external contours 1, the shape of which (cf. for example the dovetail-shaped portion of the contour line 5 in FIG. 7) is such that the external contour 1 of the substrate 2 cannot be produced with methods known from the state of the art without introducing stress cracks into the remaining substrate material 2. The angle α of the two oppositely situated legs of the V-shaped crack lines 6V-1, 6V-2, . . . which are situated between the contour line 5, on the one hand, and the removal line 9, on the other hand, is here 10°. In FIG. 7, identical or corresponding features designate otherwise identical reference numbers as in FIGS. 5A and 5B. The substrate thickness perpendicular to the substrate plane is characterised with the reference number 10. The substrate surface orientated towards the incident laser radiation 3, 7 with the reference number 4v (substrate front-side), the oppositely situated substrate surface (substrate rear-side) with the reference number 4r.

As FIG. 7 shows, introduction of a stress-relieving line portion 11 which approximates to the course of the contour line 5 is hence not absolutely necessary.

The invention can hence be used in particular also for separating contours with undercuts.

FIGS. 8A-8C show several different possibilities of how crack line portions 6a, 6b, . . . , which differ along the course of the contour line 5, begin respectively essentially at the contour line 5 and lead into the material of the contour 1 to be separated, can be produced: FIG. 8A shows V-shaped standard crack lines (see also FIG. 5C). FIG. 8B shows V-shaped multiple crack lines along the contour line course 5 in which respectively adjacent V-shaped crack lines intersect at the legs orientated towards each other. FIG. 8C shows open crack lines due to introduction respectively of only one leg of a V-shaped crack line.

FIGS. 9A and 9B show how, with an additional precipitation material 18 (here: polyoxymethylene), the inwardly situated material portion of an internal contour 1 to be separated, which is completely separated from the substrate 2 or from the contour remains 1r after introducing the removal line 9 (possibly also with parts of the contour remains 1r still adhering undesirably to the substrate 2), can be expelled. Identical reference numbers again designate in FIG. 9 (and also in FIG. 10) the features of the invention described already under these reference numbers.

As FIGS. 9A and 9B show, the beam power, which is high compared with the laser beam 3, of the material-removing laser beam 7 is coupled via a (second, cf. FIG. 10) beam-guiding optical unit 21 onto the substrate 2. The substrate 2 is mounted in a clamping device 16 (e.g. so-called chuck) such that, in a region below the internal contour 1 to be separated, a gas-sealed cavity 17 is configured on the substrate rear-side 4r.

("Above" is here the substrate front-side 4v which is orientated towards the incident laser beam). Into this cavity 17, the precipitation material 18 was introduced in advance and now is vaporised at the beginning of the illustrated material removal step (c) by focusing the laser beam 7 by means of the optical unit 21 through the substrate 2 into the cavity 17 (FIG. 9A). As a result of the laser beam-caused vaporisation, the vaporised precipitation material precipitates on the portion of the substrate rear-side 4r which is situated in the cavity 17 and forms (FIG. 9B) on at least one surface of the substrate rear-side 4r which corresponds to the internal contour 1 to be separated, a coupling layer 18' which improves coupling of the laser beam 7 into the substrate material. Vaporisation of the material 18 for precipitation on the rear-side surface 4r is implemented. Since the material of the substrate 2 is transparent for the laser radiation λ, the material of the layer 18' is however opaque for λ, coupling of the beam 7 into the substrate material is thus improved.

Subsequently, the laser radiation 7 is focused 15 by the optical unit 21 and through the substrate onto the rear-side surface 4r (cf. FIG. 9B). Corresponding to the geometry characterising the removal line 9, the focal point 15 of the laser radiation 7 is guided by multiple passage of the beam 7 along the line 9 successively from the substrate rear-side 4r towards the substrate front-side 4v in order to remove in succession the substrate material along the removal line 9, viewed over the entire substrate thickness 10, or to vaporise it as a result of the high laser energy which is introduced. After the large number (e.g. 15 times) of passages guided along the contour of the removal line 9 with the focal point 15 moving increasingly from the rear-side 4r to the front-side 4v, finally the material of the internal contour 1 which is situated inside the removal line 9 (which is illustrated here for simplified representation merely once and in the centre above the cavity 17) is detached and expelled upwards by the vapour pressure prevailing in the cavity 17. With sufficiently high vapour pressure in the cavity 17, also the separation of the undesired contour remains1r can be assisted by this (cf. FIG. 5D).

FIG. 10 illustrates a device according to the invention for implementing the method according to the invention, which is provided with a beam producing- and beam-forming arrangement 19 configured in a common laser head. The unit 19 comprises the two lasers 12 (for production of the laser beam 3 which produces the individual zones of internal damage with lower laser intensity) and 14 (for producing the material-removing laser beam 7 of higher intensity) and also two beam-guiding optical units 20 and 21 which have respectively a galvanometer scanner connected subsequent to an F-theta lens for beam deflection (the construction of such optical units is known to the person skilled in the art). The laser radiation 3 of the laser 12, focused via the F-theta lens and the galvanometer scanner of the unit 20, is hence guided towards the surface of the substrate 2 and, for producing the contour line 5, is suitably deflected by means of the galvanometer scanner. Correspondingly, the laser radiation 7 of the laser 14, focused via the F-theta lens and the galvanometer scanner of the unit 21, is imaged on the surface of the substrate 2 and is deflected in order to produce the removal line 9 by the galvanometer scanner of the unit 21.

Alternatively, also stationary lens systems can be used instead of using moving lens systems (then the substrate is moved).

A central control unit which is configured here in the form of a PC 22 with suitable memories, programmes etc. controls the beam production, beam focusing and beam deflection by means of the unit 19 via a bidirectional data- and control line 23.

Differences in the beam-guiding lens systems 20 and 21 for producing the two different laser beams 3 and 7 are as follows: the laser beam 7 is guided towards the surface in comparison to the beam 3, e.g. with a corrected F-theta lens, which leads to the formation of a point focus. The focal distance of the lens for the beam 7 is significantly greater than for the beam 3, e.g. 120 mm in comparison with 40 mm.

The invention claimed is:

1. A method for producing an internal contour (1) in a planar substrate (2) and for removing the internal contour (1) from the substrate (2), the method comprising:
    a contour definition step (a) wherein a laser beam (3) is guided over the substrate (2) along a contour line (5) defining the contour (1) to be produced, and producing a plurality of individual zones (5-1, 5-2, . . . ) of internal damage in the substrate material, and
    a material removal- and/or material deformation step (c) performed after the contour definition step (a),
        wherein, the material removal step comprises a laser beam (7) directed towards the substrate (2) surface that inscribes a removal line (9) through a thickness (10) of the substrate (2) and within the contour (1) allowing for a portion of the substrate (2) to become detached, and
        wherein, the material deformation step comprises a laser beam impinging the substrate (2) to thermally deform portions of the substrate (2) within the contour (1) thus causing the contour (1) to detach from the substrate (2); and
    a crack definition step (b) which is performed before the material removal- and/or material deformation step (c) and after the contour definition step (a), wherein a laser beam (3) is guided over the substrate (2) and produces a plurality of individual zones (6-1, 6-2, . . . ) of internal damage in the substrate material to form a plurality of crack line portions (6a, 6b, . . . ) that lead away from the contour line (5) at an angle α>0° and into the contour (1) to be separated.

2. The method according to claim 1, wherein the material removal- and/or material deformation step (c) is performed after the contour definition step (a) and wherein a material-removing laser beam (7) is guided over the substrate (2) along a removal line (9) which extends along the contour line (5) but at a spacing (8) from the latter and also in the contour (1) to be separated, and the substrate material is removed over the entire substrate thickness (10).

3. The method according to claim 2, wherein the removal line (9) is crossing the crack line portions (6a, 6b, . . . ).

4. The method according to claim 3, wherein, the crack definition step (b) produces a plurality of V-shaped crack lines (6V-1, 6V-2, . . . );
    wherein, the crack definition step (b) produces each of the plurality of V-shaped crack lines (6V-1, 6V-2, . . . ) by producing a plurality of individual zones (6-1, 6-2, . . . ) of internal damage in the substrate material along two crack line portions (6a, 6b), each of which lead from the same place on the contour line (5) and at the same angle α>0° away from the contour line (5), but, viewed along the contour line (5), in opposite directions into the contour (1) to be separated, thus forming a tip of the V-shaped crack line;
    (i) viewed along the contour line (5), the tip of each of the plurality of V-shaped crack lines (6V-1, 6V-2, . . . ) are spaced apart over the entire length of the closed contour line (5),
    and/or
    (ii) the angle α being between 20° and 40.

5. The method according to claim 2, wherein in the material removal step, an Nd:YAG laser (14) with a wavelength λ of 1,064 nm, or a Y:YAG laser (14) with a wavelength λ of 1,030 nm is used for producing the material-removing laser beam (7),
    and/or
    the average diameter of the material-removing laser beam (7), when impinging on the irradiated surface of the substrate (2), i.e. its spot diameter, is between 5 μm and 200 μm,
    and/or
    the pulse repetition frequency of the laser (14) producing the material-removing laser beam (7) is between 0.1 kHz and 200 kHz,
    and/or
    the laser (14) producing the material-removing laser beam (7) is operated as single pulse laser or as burst impulse laser,
    and/or
    the average laser power, measured directly at the beam output side of the laser (14) producing the material-removing laser beam (7), is between 10 watts and 200 watts.

6. The method according to claim 2, wherein the material removal step is implemented as follows:
    the wavelength of the material-removing laser beam (7) is chosen such that the substrate material is transparent or essentially transparent for this,
    the material-removing laser beam (7) is focused through the substrate (2) into a focal point (15) situated on the substrate rear-side (4r) which is orientated away from the beam incidence side substrate surface (substrate front-side 4v) and the material-removing laser radiation (7) is guided several times along the removal line (9) with successive displacement of the focal point (15) from the substrate rear-side (4r) towards the substrate front-side (4v) in order to remove the substrate material over the entire substrate thickness (10).

7. The method according to claim 6,
wherein
the following is performed before beginning the material removal step:
firstly, the substrate (2) is mounted via a mounting (16) such that, in the region of the contour (1) to be separated between the substrate rear-side (4r) and the mounting (16), a gas-sealed cavity (17) is formed, and
subsequently, a precipitation material (18), which has been positioned before mounting of the substrate (2) such that it is situated in the cavity (17) after mounting of the substrate (2), is vaporised, by a laser beam (3, 7) being focused into the cavity (17).

8. The method according to claim 1,
such that
the material removal- and/or material deformation step (c) is performed after the contour definition step (a) and comprises a material deformation step in which a CO2 laser beam is radiated onto the substrate (2) in the contour (1) to be separated thus plastically deforming at least portions of the contour (1) to be separated.

9. The method according to claim 1,
wherein
a stress-relieving step (d) is performed before the material removal- and/or material deformation step (c) and between the contour definition step (a) and the crack definition step (b);
wherein, in the stress-relieving step (d) a laser beam (3) is guided over the substrate (2) to produce individual zones (11-1, 11-2, . . . ) of internal damage in the substrate material, which are different than the individual zones (5-1, 5-2, . . . ) of internal damage formed during the contour definition step (a) and the individual zones (6-1, 6-2, . . . ) of internal damage formed during the crack definition step (b), to form at least one stress-relieving line portion (11), which is a crack in the substrate (2) that extends in the contour (1) to be separated and approximates to the course of the contour line (5) by maintaining constant spacing from the contour line (5).

10. The method according to claim 9,
wherein
the stress-relieving line portion (11) is a stress-relieving spiral (11S) which, instead of approximating the course of the contour line (5) by maintaining constant spacing from the contour line (5), approaches, in a spiral, the closed contour line (5) of the internal contour (1) to be removed, viewed from the centre of the internal contour (1) to be removed to the external edge of this internal contour (1).

11. The method according to claim 1 further comprising:
an after treatment step that is performed after the material removal- and/or material deformation step (c), to remove remains (1r) of the contour (1) from the substrate (2);
wherein, the after treatment step comprises one of a thermal treatment of the contour remains (1r), an ultrasonic treatment of the contour remains (1r), or the exertion of mechanical forces upon the contour remains (1r); and
wherein, the thermal treatment includes local non-homogeneous heating by guidance of a $CO_2$ laser beam, at least in portions, over the contour line (5) and/or the crack line portions (6a, 6b, . . . ).

12. The method according to claim 1,
wherein
the zones (5-1, 5-2, . . . 6-1, 6-2, . . . , 11-1, 11-2, . . . ) of internal damage are produced without ablation and without melting of substrate material.

13. The method according to claim 1,
wherein
at least some of the zones (5-1, 5-2, . . . , 6-1, 6-2, . . . , 11-1, 11-2, . . . ) of internal damage are produced by an induced absorption being produced in the substrate material along, viewed in the beam direction of the laser beam (3), an extended portion (3c) of a laser beam focal line (3b), such that the absorption induces a crack formation along this extended portion (3c) in the substrate material.

14. The method according to claim 1,
wherein
in the contour definition step (a) and/or in the crack definition step (b), laser beams (3) of identical beam properties are guided over the substrate (2) and/or in that these laser beams (3) are produced by one and the same laser (12) and are radiated onto the substrate (2) by the same beam-forming lens system (20),
and/or
the wavelength λ of a laser (12) producing at least one of these laser beams (3) is chosen such that the substrate material is transparent or is essentially transparent for this wavelength, there being understood by the latter that the substrate material absorbs 10% or less of the intensity of the laser beam (3) at the wavelength λ per millimeter of depth of the substrate material,
and/or
the average diameter δ of at least one of these laser beams (3), when impinging on the irradiated surface of the substrate (2), i.e. the spot diameter δ, is between 0.5 μm and 5 μm,
and/or
the pulse duration t of a laser (12) producing at least one of these laser beams (3) is chosen such that, within the interaction time with the substrate material, the heat diffusion in the substrate material is negligible,
and/or
the pulse repetition frequency of a laser (12) producing at least one of these laser beams (3) is between 10 kHz and 1,000 kHz,
and/or
a laser (12) producing at least one of these laser beams (3) is operated as single pulse laser or as burst pulse laser,
and/or
the average laser power, measured directly at the beam output side of a laser (12) producing at least one of these laser beams (3), is between 10 watts and 100 watts.

15. The method according to claim 1,
wherein
the contour (1) is produced in a planar glass substrate (2) and is separated therefrom.

16. The method according to claim 1,
wherein
the following is performed before beginning the material removal step:
firstly, the substrate (2) is mounted via a mounting (16) such that, in the region of the contour (1) to be separated between the substrate rear-side (4r) and the mounting (16), a gas-sealed cavity (17) is formed, and subsequently, a precipitation material (18), which has been positioned before mounting of the substrate (2) such that it is situated in the cavity (17) after mounting of the substrate (2), is vaporised, by a laser beam (3, 7) being focused into the cavity (17).

* * * * *

UNITED STATES PATENT AND TRADEMARK OFFICE
CERTIFICATE OF CORRECTION

PATENT NO. : 10,280,108 B2
APPLICATION NO. : 15/032252
DATED : May 7, 2019
INVENTOR(S) : Rico Bohme It is certified that error appears in the above-identified patent and that said Letters Patent is hereby corrected as shown below:

On the Title Page

In Column 2, item (57), Abstract, Line 12, delete "a>0°," and insert -- $\alpha$>0°, --, therefor.

On page 6, Column 1, item (56), other publications, Line 31, delete "CO2" and insert -- $CO_2$ --, therefor.

On page 6, Column 1, item (56), other publications, Lines 35-36, delete "Eelectropolishing;" and insert -- Electropolishing; --, therefor.

On page 6, Column 2, item (56), other publications, Line 30, delete "pluse" and insert -- pulse --, therefor.

In the Claims

In Column 24, Line 32, Claim 4, delete "40." and insert -- 40°. --, therefor.

In Column 25, Line 25, Claim 8, delete "CO2" and insert -- $CO_2$ --, therefor.

In Column 26, Line 42, Claim 14, delete "t" and insert -- $\tau$ --, therefor.

Signed and Sealed this
Twenty-ninth Day of October, 2019

Andrei Iancu
*Director of the United States Patent and Trademark Office*